US006493796B1

(12) United States Patent
Arnon et al.

(10) Patent No.: US 6,493,796 B1
(45) Date of Patent: Dec. 10, 2002

(54) METHOD AND APPARATUS FOR MAINTAINING CONSISTENCY OF DATA STORED IN A GROUP OF MIRRORING DEVICES

(75) Inventors: Dan Arnon, Boston, MA (US); Yuval Ofek, Framingham, MA (US); Douglas E. LeCrone, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/388,328

(22) Filed: Sep. 1, 1999

(51) Int. Cl.[7] ............................................... G06F 12/00
(52) U.S. Cl. ......................... 711/114; 710/22; 709/213
(58) Field of Search ................................. 709/213, 214, 709/215, 216, 217; 710/22; 711/111, 112, 114

(56) References Cited

U.S. PATENT DOCUMENTS

| 5,313,585 | A | * | 5/1994 | Jeffries et al. ............... 711/112 |
| 5,542,065 | A | * | 7/1996 | Burkes et al. ............... 711/114 |
| 5,799,141 | A |   | 8/1998 | Galipeau et al. |
| 5,799,323 | A |   | 8/1998 | Mosher, Jr. et al. |
| 5,889,935 | A | * | 3/1999 | Ofek et al. .................. 709/217 |
| 5,901,327 | A |   | 5/1999 | Ofek |
| 6,282,619 | B1 | * | 8/2001 | Islam et al. .................. 711/114 |
| 6,304,941 | B1 | * | 10/2001 | Lyons et al. ................. 711/114 |

FOREIGN PATENT DOCUMENTS

WO  WO 96/37837  11/1996

OTHER PUBLICATIONS

International Search Report.

* cited by examiner

Primary Examiner—Matthew Kim
Assistant Examiner—Christian P. Chace
(74) Attorney, Agent, or Firm—Richard F. Giunta; John M. Gunther; Penelope S. Wilson

(57) ABSTRACT

In one embodiment, mirroring communication from a second source storage device to a second target storage device in a data mirroring system is disabled when mirroring communication from a first source storage device to a first target storage device is disabled. In another embodiment, information is stored in a data mirroring system identifying at least one subset of a plurality of mirrored source storage devices for which a consistent representation of data is desired to be maintained on at least one corresponding subset of a plurality of target storage devices. In yet another embodiment, at least one of a plurality of mirrored source storage devices is placed in one of a first state, a second state, and a third state. In response to a source storage system receiving a write-requesting command chain directed to a mirrored source storage device in the first state, the command chain is permitted to commit and data written by the command chain is transferred to a corresponding target storage device. In response to the source storage system receiving a write-requesting command chain directed to a mirrored source storage device in the second state, the command chain is prevented from committing. In response to the source storage system receiving a write-requesting command chain directed to a mirrored source storage device in the third state, the command chain is permitted to commit without transferring data written by the command chain to a corresponding target storage device.

65 Claims, 8 Drawing Sheets

| STORAGE DEVICE STATUS FLAGS | | |
|---|---|---|
| DEVICE # | CONSISTENCY GROUP FLAG | STATE FLAG |
| 1 | YES | ON-LINE |
| 2 | NO | PENDING OFF-LINE |
| ... | ... | ... |
| P | YES | OFF-LINE |

METHOD AND APPARATUS FOR MAINTAINING CONSISTENCY OF DATA STORED IN A GROUP OF MIRRORING DEVICES

FIELD OF THE INVENTION

The present invention is directed to a method and apparatus for maintaining consistency of data stored in a group of mirroring devices.

DESCRIPTION OF THE RELATED ART

A number of computer system configurations mirror information stored in source storage devices to target storage devices that can be disposed at locations remote from the source storage devices. An example of such a computer system is a data mirroring system 100 discussed below in connection with FIG. 1.

In the data mirroring system 100 of FIG. 1, one or more host CPU's 102 are coupled (via one or more communication links 114) to a source storage system 104. In the example shown, the source storage system 104 includes a plurality of "source" storage devices 110a–f. The source storage devices 110a–f can be included in a single source storage system 104 as shown in FIG. 1, or multiple source storage systems 104 can be employed, and the source storage devices 110a–f can be distributed across the multiple source storage systems. Each source storage system 104 may, for example, comprise a storage system from the SYMMETRIX line of disc arrays available from EMC Corporation, Hopkinton, Mass.

The data stored in the source storage devices 110a–f may be crucial to the operation of the host CPU(s) 102. Therefore, a contingency solution is desirable in the event that a problem is experienced with any of the source storage devices 110a–f to ensure that the data stored thereby is not lost, and to minimize the risk of the host CPU(s) 102 being down due to problems with the source storage devices 110a–f. Potential problems with the source storage devices 110a–f may include, for example, hardware or software errors that may make stored data unrecoverable. Additionally, catastrophic events such as an earthquake or other natural disaster could result in the destruction of one or more of the source storage devices 110a–f.

One solution for protecting the data stored in the source storage devices 110a–f is to mirror the data in a corresponding set of "target" storage devices. The data mirroring system 100 of FIG. 1 is an example of such a system, wherein the source storage system 104 is coupled (via links 112a–f) to a target storage system 106. The target storage system 106 includes a plurality of target storage devices 116a–f corresponding, respectively, to the source storage devices 110a–f in the source storage system 104. As data is written to any of the source storage devices 110a–f, it is also written to a corresponding one of the target storage devices 116a–f in the target storage system 106. If one of the source storage devices 110a–f is destroyed or experiences an error that renders stored data unrecoverable, the data can be retrieved from the corresponding one of the target storage devices 116a–f. The target storage devices 116a–f can be included in a single target storage system 106 as shown in FIG. 1, or multiple target storage systems 106 can be employed, and the target storage devices 116a–f can be distributed across the multiple target storage systems 106. As with the source storage system(s) 104, each of the target storage systems 106 may, for example, be a storage system from the SYMMETRIX line of disc arrays available from EMC Corporation, Hopkinton, Mass.

When each of the source and target storage systems 104 and 106 is implemented using one or more of the SYMMETRIX line of disk arrays available from EMC Corporation, a feature called SYMMETRIX Remote Data Facility (SRDF) can be employed to implement the connection therebetween. SRDF is described in numerous publications available from EMC Corporation, including the SYMMETRIX Remote Data Facility Product Manual, P/N 200-999-554, rev. B, June 1995. SRDF is also described in U.S. Pat. No. 5,544,347 (Yanai).

In the illustrative data mirroring system 100 of FIG. 1, first, second, and third sets of source storage devices 110a–b, 110c–d, and 110e–f, respectively, in the source storage system 104 are in communication (via links 112a–b, 112c–d, and 112e–f, respectively) with corresponding first, second, and third sets of target storage devices 116a–b, 116c–d, and 116e–f in the target storage system 106. The links 112 are referred to herein as "mirroring links," and the term "mirroring communication" is used herein to refer to communication between source and target storage systems 104 and 106 over the mirroring links 112 that permits the target storage devices 116a–f to mirror data stored by the source storage devices 110a–f. As shown in FIG. 1, the source storage devices 110a–b, the mirroring links 112a–b, and the target storage devices 116a–b constitute a first mirroring group 108a; the source storage devices 110c–d, the mirroring links 112c–d, and the target storage devices 116c–d constitute a second mirroring group 108b; and the source storage devices 110e–f, the mirroring links 112e–f, and the target storage devices 116e–f constitute a third mirroring group 108c. A "mirroring group" is a group of storage devices in the source and target storage systems 104 and 106 between which data can be transferred via a common set of mirroring links 112. Generally, storage devices 110 and 116 do not share any mirroring links 112 with storage devices 110 and 116 in other mirroring groups 108.

To perform a write operation to the source storage system 104, a host CPU 102 transmits an "I/O command chain" to the source storage system 104. Each I/O command chain can include one or more commands directed to a particular logical volume stored by the source storage system 104. A logical volume is a unit of information that the host CPU 102 perceives to correspond to a single physical storage device, but that may be mapped within the source storage system 104 to physical storage space on one or more source storage devices 110. An I/O command chain for a write operation ("a write-requesting command chain") includes various instructions for the source storage system 104 receiving the I/O command chain, as well as the data to be written during the operation. The host CPU 102 generally receives only a single message back from the source storage system 104 in response to its sending of a write-requesting command chain. This message generally indicates either: (1) that the I/O command chain has been "committed" (i.e., processed successfully) by the source storage system 104, or (2) that an error occurred preventing the I/O command chain from being committed by the source storage system 104. Typically, the source storage system 104 will not provide the "I/O command chain committed" message back to the host CPU 102 unless and until the data has been written successfully to one or more of the source storage devices 110, or to a temporary storage space (such as cache) in the source storage system 104.

One of the purposes for mirroring data in the target storage system 106 is that if the data on the source storage system 104 is rendered unrecoverable, the data can be retrieved from the target storage system 106. Thus, it is desirable to ensure that the data stored in the target storage system 106 is internally consistent, and reflects an accurate mirror of the data stored in the source storage system 104 at some particular point in time. If the data in the target storage system 106 does not represent an accurate mirror of the data in the source storage system 104 for a given point in time, the data in the target storage system 106 cannot be reloaded onto the source storage system 104 to place the source storage system 104 back into a valid state. For example, if the data stored in the source storage system 104 and mirrored on the target storage system 106 is included in a database, but the information stored in target storage system 106 does not reflect an accurate picture of the database at a given point in time, then if an error is encountered that prevents the database from being recovered from the source storage system 104, the target storage system 106 cannot be used to recover the database because the data stored thereby is not an accurate reflection of the state of the database at any particular point in time.

In a data mirroring system such as the data mirroring system 100 shown in FIG. 1, Applicant's have recognized that malfunctions with the mirroring links 112a–f that result in the loss of mirroring communication between the source and target storage systems 104 and 106 for one of the mirroring groups 108a–c can cause a data consistency problem to arise under certain circumstances. Suppose, for example, that all of the mirroring links 112a–b for the mirroring group 108a were to malfunction so that mirroring communication over the mirroring links 112a–b was disabled, thereby preventing updates to the source storage devices 110a–110b from being transferred to the target storage devices 116a–b. Suppose further that mirroring operations were to continue normally over the mirroring links 112c–d and 112e–f for the mirroring groups 108b and 108c, respectively, so that updates to the source storage devices 110c–f would continue to be transferred to the target storage devices 116c–f. If, under these circumstances, the data stored in either of the target storage devices 116a–b was logically related to the data stored in any of target storage devices 116c–f (e.g., if they stored potions of the same database), then the data stored in the target storage system 106 would not represent a valid state of the data stored in the source storage system 104 at any particular point in time. Therefore, if the source storage system 104 were to fail in the above-described situation, the data on the target storage system 106 could not be used to place the source storage system 104 back into a valid state for any particular point in time.

The above-described problem may be better understood in light of the following illustrative situation in which the host CPU(s) 102 write "dependent" data units to respective source storage devices 110 when mirroring communication is disabled for only one of the source storage devices 110 to which the dependent data units are being written. A second unit of data is dependent on a first unit of data if the second unit of data is a function of the first unit of data so that, if the first unit of data is altered, the second unit of data must also be altered if it is to accurately reflect the current value of the first unit of data. For example, if first, second, and third units of data represent values "A," "B," and "A +B," respectively, then the third unit of data is dependent on both the first and the second units of data, whereas the first and second units of data are not dependent on one another.

Using this simple example of dependent data units, in the situation described above wherein mirroring communication is disabled over the mirroring links 112a–b but is enabled over the mirroring links 112c–f, if the host CPU(s) 102 initially write the first unit of data (i.e., the value "A") to the source storage device 110a in the mirroring group 108a ("the disabled mirroring group"), and subsequently write the third unit of data (i.e., the value "A+B") to the source storage device 110c in the mirroring group 108b ("an operational mirroring group"), then both the first and third units of data would be written to the source storage system 104, but only the third unit of data (and not the first unit of data) would be written to the target storage system 106. As a result, the target storage system 106 would store an updated value of "A+B," without also storing an updated value of "A." This inconsistency can pose problems if it becomes necessary to recover the data from the target storage system 106.

One technique that has been used in the past to avoid the above-described data inconsistency problem has been to prevent the source storage system 104 from committing any write-requesting command chain from a host CPU 102 to a source storage device 110a–f if that source storage device 110a–f is a member of a mirroring group 108 that is unable to engage in mirroring communication across its mirroring links 112. Using this technique, since each write-requesting command chain directed to a source storage device 110 in a disabled mirroring group 108 is not committed by the source storage system 104, the host CPU 102 transmitting the I/O command chain will repeatedly attempt (unsuccessfully) to perform the write operation.

It should be appreciated that application programs executing on the host CPU(s) 102 typically will not begin execution of an instruction that is dependent upon a unit of data updated by a previous instruction until the previous instruction completes, which requires that the I/O command chain that implements the previous instruction has been committed by the source storage system 104. Therefore, by preventing write-requesting command chains directed to source storage devices 110a–f for which mirroring communication has been disabled from committing, it is ensured that no later instructions dependent on the data to be written by those write-requesting command claims will be executed, thereby avoiding the above-discussed data inconsistency problem. In this respect, the data stored in the target storage system 106 will be a valid mirror of the data stored in the source storage system 104 at the point that the mirroring group became disabled.

It should be appreciated that although the above-described technique avoids a data inconsistency problem, it does so by preventing I/O command chains directed to source storage devices 110 within a disabled mirroring group from ever completing. As a result, the CPU 102 that initiates the I/O command chain will repeatedly attempt (unsuccessfully) to execute the command chain, eventually resulting in a crash of the application or other program that includes the command chain.

SUMMARY OF THE INVENTION

According to one aspect of the present invention, a method for use in a data mirroring system involves disabling mirroring communication from a second source storage device to a second target storage device when mirroring communication from a first source storage device to a first target storage device is disabled.

According to another aspect of the present invention, a source storage system for use in a data mirroring system includes at least first and second source storage devices to be coupled to at least one host to enable the at least one host to perform write operations to the first and second source storage devices, and further to be coupled to at least first and second target storage devices, respectively, to enable mirroring communication from the at least first and second source storage devices to the at least first and second target storage devices, and at least one controller to, responsive to mirroring communication from the first source storage device to the first target storage device becoming disabled, disable mirroring communication from the second source storage device to the second target storage device.

According to another aspect of the invention, at least one computer-readable medium has a plurality of instructions stored thereon which, when executed by at least one processor included in a data mirroring system, cause the at least one processor perform a method including a step of disabling mirroring communication from a second source storage device to a second target storage device when mirroring communication from a first source storage device to a first target storage device is disabled.

According to another aspect of the present invention, a method for use in a data mirroring system involves instructing at least one source storage system to disable mirroring communication from a second source storage device to a second target storage device in response to at least one host receiving an indication that mirroring communication from a first source storage device to a first target storage device is disabled.

According to another aspect of the invention, at least one computer-readable medium has a plurality of instructions stored thereon which, when executed by at least one host processor included in a data mirroring system, cause the at least one host processor to perform a method including a step of instructing the at least one source storage system to disable mirroring communication from a second source storage device to a second target storage device in response to the at least one host processor receiving an indication that mirroring communication from a first source storage device to a first target storage device is disabled.

According to another aspect, a host for use in a data mirroring system includes at least one controller to be coupled to at least first and second source storage devices to perform write operations to the at least first and second source storage devices. The at least one controller is configured to, responsive to receiving an indication that mirroring communication from the first source storage device to a first target storage device is disabled, instruct at least one source storage system in which the at least first and second source storage devices are included to disable mirroring communication from the second source storage device to a second target storage device.

According to another aspect of the invention, a method for use in a data mirroring system involves storing information in the data mirroring system identifying at least one subset of a plurality of mirrored source storage devices for which a consistent representation of data is desired to be maintained on at least one corresponding subset of a plurality of target storage devices.

According to another aspect of the invention, a host for use in a data mirroring system includes at least one memory, and at least one controller to store information in the at least one memory identifying at least one subset of a plurality of mirrored source storage devices for which a consistent representation of data is desired to be maintained on at least one corresponding subset of a plurality of target storage devices.

According to another aspect of the invention, a source storage system for use in a data mirroring system includes at least one memory, and at least one controller to store information in the at least one memory identifying at least one subset of a plurality of mirrored source storage devices for which a consistent representation of data is desired to be maintained on at least one corresponding subset of a plurality of target storage devices.

According to another aspect of the invention, a method for use in a data mirroring system involves placing at least one of a plurality of mirrored source storage devices in one of a first state, a second state, and a third state. In response to a source storage system receiving a write-requesting command chain directed to the at least one of the plurality of mirrored source storage devices when the at least one of the plurality of mirrored source storage devices is in the first state, the command chain is permitted to commit and data written by the command chain is transferred to a corresponding one of a plurality of target storage devices. In response to the source storage system receiving a write-requesting command chain directed to the at least one of the plurality of mirrored source storage devices when the at least one of the plurality of mirrored source storage devices is in the second state, the command chain is prevented from committing. In response to the source storage system receiving a write-requesting command chain directed to the at least one of the plurality of mirrored source storage devices when the at least one of the plurality of mirrored source storage devices is in the third state, the command chain is permitted to commit without transferring data written by the command chain to the corresponding one of the plurality of target storage devices.

According to yet another aspect of the invention, a source storage system for use in a data mirroring system includes a plurality of mirrored source storage devices to be coupled to at least one host to permit the at least one host to perform write operations to the plurality of mirrored source storage devices, and further coupled to a plurality of target storage devices to enable mirroring communication from each of the plurality of mirrored source storage devices to a corresponding one of the plurality of target storage devices, and at least one controller to place at least one of the plurality of mirrored source storage devices in one of a first state, a second state, and a third state, wherein, in response to the source storage system receiving a write-requesting command chain directed to the at least one of the plurality of mirrored source storage devices when the at least one of the plurality of mirrored source storage devices is in the first state, the at least one controller permits the command chain to commit and transfers data written by the command chain to the corresponding one of the plurality of target storage devices, wherein, in response to the source storage system receiving a write-requesting command chain directed to the at least one of the plurality of mirrored source storage devices when the at least one of the plurality of mirrored source storage devices is in the second state, the at least one controller prevents the command chain from committing, and wherein, in response to the source storage system receiving a write-requesting command chain directed to the at least one of the plurality of mirrored source storage devices when the at least one of the plurality of mirrored source storage devices is in the third state, the at least one controller permits the command chain to commit without transferring data written by the command chain to the corresponding one of the plurality of target storage devices.

According to another aspect of the invention, at least one computer-readable has a plurality of instructions stored thereon which, when executed by at least one processor included in a data mirroring system, cause the at least one processor to perform a method including steps of: (A) placing at least one of a plurality of mirrored source storage devices in one of a first state, a second state, and a third state; (B1) in response to a source storage system receiving a write-requesting command chain directed to the at least one of the plurality of mirrored source storage devices when the at least one of the plurality of mirrored source storage devices is in the first state, permitting the command chain to commit and transferring data written by the command chain to a corresponding one of a plurality of target storage devices; (B2) in response to the source storage system receiving a write-requesting command chain directed to the at least one of the plurality of mirrored source storage devices when the at least one of the plurality of mirrored source storage devices is in the second state, preventing the command chain from committing; and (B3) in response to the source storage system receiving a write-requesting command chain directed to the at least one of the plurality of mirrored source storage devices when the at least one of the plurality of mirrored source storage devices is in the third state, permitting the command chain to commit without transferring data written by the command chain to a corresponding one of the plurality of target storage devices.

BRIEF DESCRIPTION OF THE DRAWINGS

FIGS. 4A–B and 5 illustrative examples of tables of flags that may be stored in each of the source storage systems of FIGS. 1–2 to assist in maintaining the consistency of data stored on a plurality of target storage devices according to one embodiment of the present invention;

DETAILED DESCRIPTION OF THE INVENTION

Figure 1:
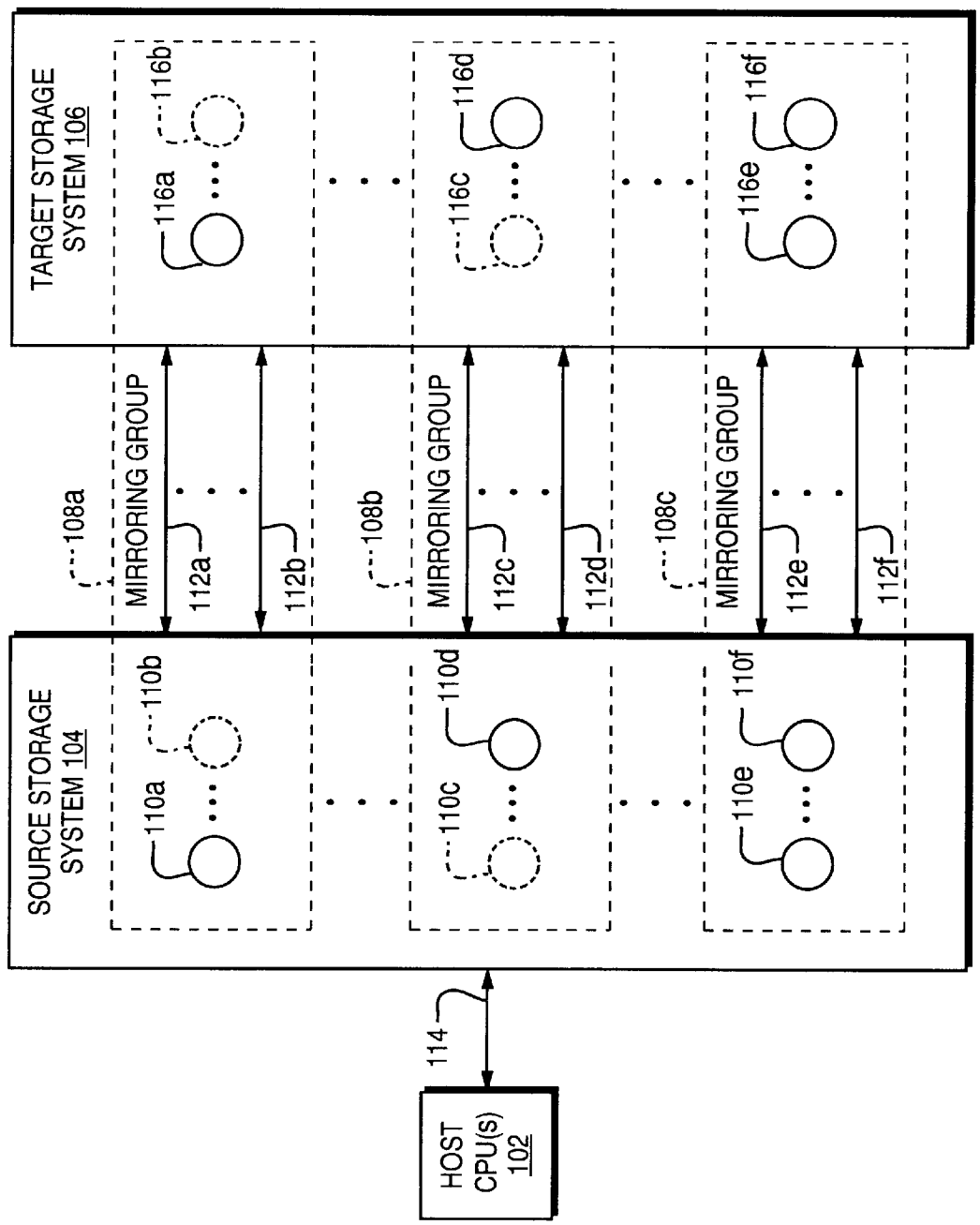
FIG. 1 is a block diagram showing an illustrative example of a data mirroring system with which aspects of the present inventions can be employed.

According to one aspect of the present invention, in a data mirroring system such as the data mirroring system 100 of FIG. 1, steps are taken to ensure that a consistent data set is maintained on the target storage system 106 when mirroring communication for a source storage device 110 is lost, without also causing the software process (e.g., an application program) on the host CPU(s) 102 to crash.

It should be appreciated that the above-described data inconsistency problem that can result from the loss of mirroring communication is attributable to the fact that the mirroring links 112a–f are operational for some of the mirroring groups 108a–c, but not for all of them. In accordance with one illustrative embodiment of the present invention, when it is determined that all of the mirroring links 112a–f for a particular mirroring group 108 have become disabled (i.e., no longer support mirroring communication between the source and target storage devices 110 and 116 in the mirroring group 108), mirroring communication over the mirroring links 112a–f for the other mirroring groups 108 may also be disabled. This can be considered as "logically breaking" the mirroring links 112a–f associated with these other mirroring groups 108. As such, it should be appreciated that breaking all of the mirroring links 112a–f at the same time (e.g., a time when the mirroring links 112a–f are physically disabled for a particular mirroring group 108) prevents any further updates from being made to any of the target storage devices 116a–f. Thus, after all of the mirroring links 110a–f have been broken, the target storage system 106 stores a set of data that represents an accurate mirror of data stored in the source storage system 104 at a particular point in time (i.e., the point in time when mirroring communication for one of the mirroring groups 108 became disabled).

Although logically breaking the remaining mirroring links 112a–f will result in a loss of the mirroring capability by the target storage system 106, it should be appreciated that after all of the mirroring links 112a–f have been logically broken, the source storage system 104 can again commit write-requesting command chains directed to the source storage devices 110 included in the disabled mirroring group 108, and the application programs executing on the host CPU(s) 102 can continue operating without crashing as a result of repeatedly attempting (unsuccessfully) to perform such write operations. Meanwhile, the problem experienced by the mirroring links 112 that resulted in the loss of mirroring communication for one of the mirroring groups 108 can be addressed. Once corrected, all of the mirroring links 112a–f can be restored, thereby enabling the mirroring capability provided by the target storage system 106 to be brought back on line.

It should be appreciated that logically breaking all of the mirroring links 112a–f whenever the mirroring links 112 are lost for a particular mirroring group 108 achieves the result of preventing the above-discussed data consistency problem for the data on the target storage system 106. This can be accomplished according to one embodiment of the present invention in the manner discussed below. However, applicants have also recognized that it may not be necessary to logically break all of the mirroring links 112a–f to achieve the data consistency goals discussed above. In this respect, it should be appreciated that the target storage system 106 may include multiple sets of logically unrelated data, e.g., multiple unrelated databases. For such logically unrelated sets of data, it is unnecessary to maintain consistency therebetween. Thus, if a loss were experienced of the mirroring links 112a–f associated with a mirroring group 108 including target storage devices 116 that store a particular database, it would be unnecessary to logically break the mirroring links 112 associated with other mirroring groups 108 including only target storage devices 116 that store unrelated data. Therefore, in accordance with another illustrative embodiment of the invention, the mirroring links 112a–f are logically broken only for mirroring groups 108 that include target storage devices 116 that store data logically related to the data stored in the target storage devices 116 associated with a mirroring group 108 for which mirroring communication has been lost. In this manner, the impact on the mirroring capabilities of the target storage system 106 are minimized.

Similarly, it should be appreciated that all of the target storage devices 116a–f in a particular mirroring group 108*a*–*c* may not store logically related data. Thus, in another illustrative embodiment of the invention, mirroring links 112 within a mirroring group 108 may be logically broken to disable mirroring communication between only some of the source and target storage devices 110 and 116 that the mirroring links 112 support. For example, if target storage devices 116*a*–*c* all store data for a common database, and the mirroring links 112*a*–*b* for mirroring group 108*a* become disabled, then the mirroring links 112*c*–*d* for mirroring group 108*b* can be logically broken to disable mirroring communication between the source storage device 110*c* and the target storage device 116*c* to maintain consistency of the data in the target storage system 106 for the database, without also disabling mirroring communication between the source storage device 110*d* and the target storage device 116*d*. Therefore, if the source and target storage devices 110*d* and 116*d* store data that is unrelated to the database stored by the source and target storage devices 110*a*–*c* and 116*a*–*c*, then mirroring communication over the mirroring links 112*c*–*d* of mirroring group 108*b* may remain enabled between source storage device 110*d* and target storage device 116*d*, thereby minimizing the impact on the mirroring capabilities of the target storage system 106.

The above-described embodiments of the present invention can be implemented in numerous ways, and the present invention is not limited to any particular implementation. In accordance with the above-identified embodiments of the invention wherein mirroring communication across mirroring links 112*a*–*f* is selectively disabled on a device-by-device basis, the source storage devices 110*a*–*f* may, for example, be categorized into one or more so-called "consistency groups." A consistency group in this context is a group of source storage devices 110 for which an effort is made to ensure that the data stored therein and in the corresponding target storage devices 116 is kept consistent. For example, if the source storage devices 110*a* and 110*c* store dependent units of data, it may be desirable to include the source storage devices 110*a* and 110*c* in the same consistency group so that efforts can be made to prevent data consistency problems such as those described above.

Consistency groups can be implemented in any of numerous ways, and the present invention is not limited to any particular implementation. In one embodiment, for example, the source storage system 104 stores information identifying only whether or not each source storage device 110 is a member of a consistency group, and information identifying the particular source storage devices 110 in each consistency group is maintained only by the host CPU(s) 102. It should be appreciated, however, that such consistency group information can be stored in numerous other ways, as the invention is not limited to the embodiment wherein most consistency group information is maintained by the host CPU(s) 102. For example, all relevant consistency group information may alternatively be stored in memory associated with the source and/or target storage systems 104 and 106.

In one embodiment of the invention, when a host CPU 102 (FIG. 1) issues a write-requesting command chain to one of the source storage devices 110*a*–*f* (the "destination" storage device), as long as at least one of the mirroring links 112 in the mirroring group 108 of the destination storage device 110 is operational (i.e., mirroring communication for the destination storage device 110 is enabled), the source storage system 104 will commit the I/O command chain after the to-be-written data has been transferred to both the source storage system 104 and the target storage system 106. When all of the mirroring links 112 for a mirroring group 108 become non-operational (i.e., mirroring communication for the destination storage device 110 is disabled), this is detected when a host CPU 102 attempts to write to a source storage device 110 in the mirroring group 108. Specifically, when a host CPU 102 issues a write-requesting command chain to a destination storage device 110 for which mirroring communication is disabled, the source storage system 104 including the destination storage device 110 temporarily prevents write-requesting command chains directed to the destination storage device 110 from committing.

During the time period that write-requesting command chains directed to the destination storage device 110 are temporarily prevented from committing, steps may be taken to prevent all of the other source storage devices 110*a*–*f* that are included in the same consistency group as the destination storage device 110 from communicating across the mirroring links 112 associated therewith (i.e., mirroring communication for these source storage devices 110 is disabled). This disabling of mirroring communication for the relevant source storage devices 110 can be accomplished in numerous ways, and the invention is not limited to any particular implementation. For example, flags may be stored in a memory associated with the source storage devices 110 indicating that certain source storage devices 110 are not to transfer data across the mirroring links 112. Alternatively, the relevant mirroring links 112 may be physically broken. However, because a single mirroring group 108 may contain source storage devices 110 from several consistency groups, as discussed above, it may be desirable to disable mirroring communication across the mirroring links 112 on a device-by-device basis, so that information can continue to be transferred across the mirroring links 112 for the source storage devices 110 that are not included in the relevant consistency group.

After mirroring communication across the mirroring links 112 has been disabled for each of the source storage devices 110 included in the same consistency group as the destination storage device 110, the source storage system 104 including the destination storage device 110 is again permitted to commit the write-requesting command chain directed to the destination storage device 110. Because mirroring communication has been disabled for all source storage devices 110 in the destination storage device's consistency group, the target storage devices 116*a*–*f* in this consistency group will store a set of data representing a "snapshot" of the data stored by the source storage system 104 just prior to the time that mirroring communication was disabled for the consistency group. In accordance with this embodiment of the invention, because the source storage system 104 only temporarily prevents write-requesting command chains directed to source storage devices 110 included in disabled mirroring groups 108 from committing, data consistency problems such as those discussed above can be avoided without causing the application software running on the host CPU(s) 102 to crash.

Applicants have recognized that, when disabling mirroring communication across mirroring links 112 for multiple source and target storage devices 110 and 116 in response to mirroring communication for a mirroring group 108 being lost, the disabling of mirroring communication for different ones of these multiple source storage devices 110 at different times can itself cause a data consistency problem similar to that described above. For example, assume that source storage devices 110*a*, 110*c*, and 110*e* of FIG. 1 are all included in the same consistency group, and mirroring communication is to be disabled for source storage devices 110*c* and 110*e* in response to the detection, when trying to write to storage device 110a, that mirroring communication for source storage device 110a has been lost. If the source storage system 104 is permitted to commit write-requesting command chains directed to either of the source storage devices 110c and 100e prior to verifying that mirroring communication for both devices has been disabled, the relative timing of the disabling of mirroring communication for the source storage devices 110c and 110e may result in the occurrence of a data consistency problem in the target storage system 106. For example, if mirroring communication was disabled for the source storage device 110c before source storage device 110e, a data consistency problem would arise if an I/O command chain requesting the write of a first unit of data to the source storage device 110c was committed by the source storage system 104 after mirroring communication for the source storage device 110c was disabled, and then a subsequent I/O command chain requesting the write of a second unit of data, dependent on the first unit of data, to the source storage device 110e was both committed by the source storage system 104 and transferred to the target storage system 106 before mirroring communication for the source storage device 110e was disabled.

To address this potential problem, in one embodiment of the invention, when mirroring communication across any of the mirroring links 112 is to be disabled for source storage devices 110 within a consistency group, the source storage system 104 is temporarily prevented from committing write-requesting command chains directed to all source storage devices 110 in the consistency group. Only after mirroring communication for all of the source storage devices 110 in the relevant consistency group has been disabled is the source storage system 104 again permitted to commit write-requesting command chains directed to these source storage devices 110. In this manner, the host CPU(s) 102 will be unable to successfully write to these source storage devices 110 only during the period of time that mirroring communication is being disabled for all of the source storage devices 110 in the relevant consistency group.

The above-described technique for selectively disabling mirroring communication for certain source storage devices 110 can be accomplished in any of a number of ways, and the invention is not limited to any particular implementation. One illustrative example of a technique that may be used to achieve these objectives is described below in connection with FIGS. 2–7, wherein certain flags stored in each source storage system 104 indicate how that source storage system 104 should respond to write-requesting command chains from the host CPU(s) 102 that are directed to its source storage devices 110. It should be appreciated, however, that other techniques and/or different flags than those described below may alternatively be employed, and that the invention is not limited to the particular technique or flags described.

Figure 2:
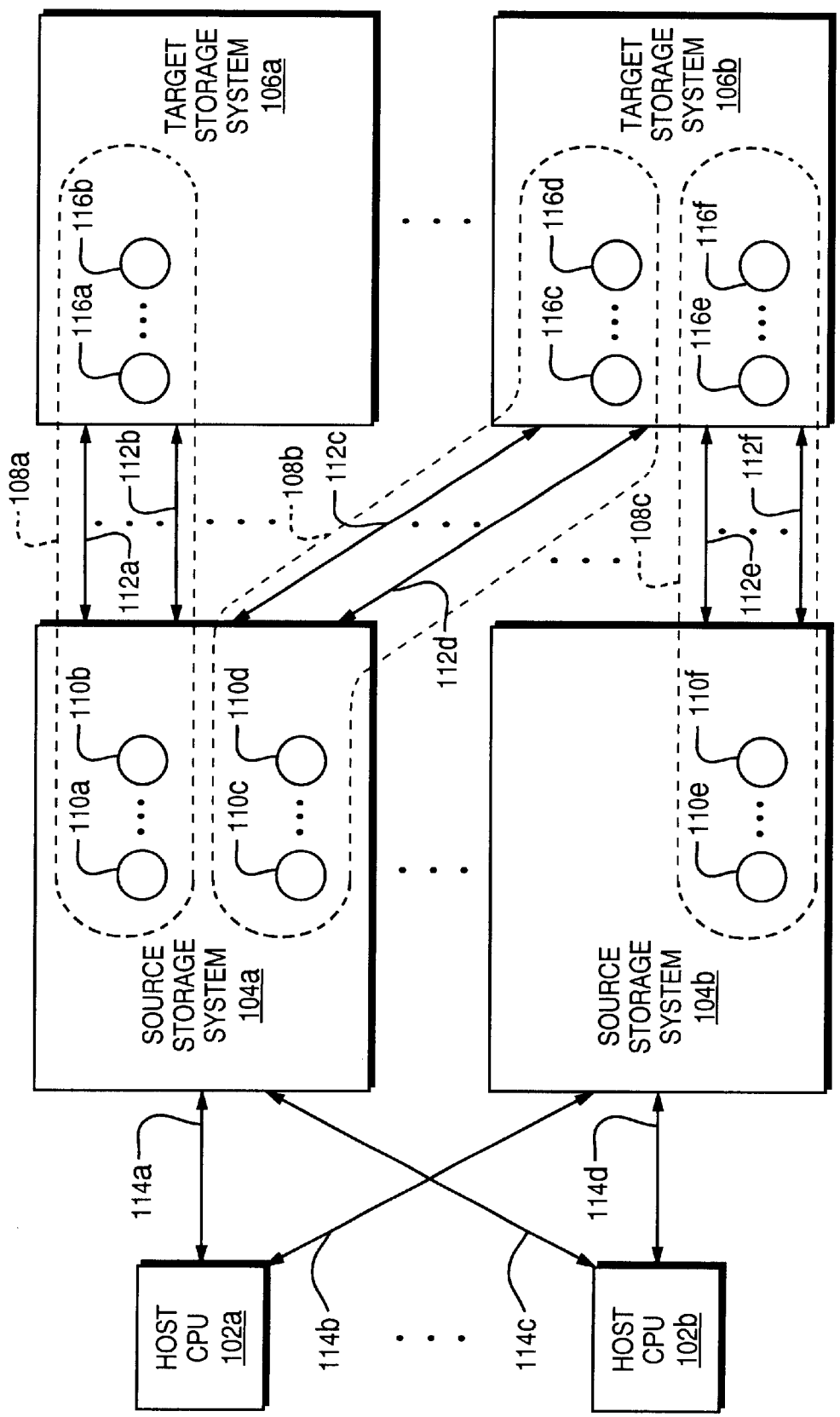
FIG. 2 is a block diagram showing an example of a data mirroring system such as that shown in FIG. 1 that employs multiple source and target storage systems.

FIG. 2 shows an illustrative example of a data mirroring system such as that shown in FIG. 1, including multiple source storage systems 104a–b and multiple target storage systems 106a–b. In the embodiment shown, the host CPUs 102 include a pair of host CPUs 102a–b. As shown, each of the host CPUs 102a and 102b may be coupled (via communication links 114a–d) to both of the source storage systems 104a and 104b, and each of the source storage systems 104a and 104b may be coupled (via the mirroring links 112a–f) to one or both of the target storage systems 106a and 106b. If the mirroring groups 108a–c of FIG. 1 were implemented on the data mirroring system of FIG. 2, the mirroring group 108a (FIG. 1) would be supported by the source storage system 104a and the target storage system 106a, the mirroring group 108b (FIG. 1) would be supported by the source storage system 104a and the target storage system 106b, and the mirroring group 108c (FIG. 1) would be supported by the source storage system 104b and the target storage system 106b. It should be appreciated that FIG. 2 shows only one example of how multiple CPU(s) 102 and multiple storage systems 104 and 106 may be combined in a manner supporting a plurality of mirroring groups, and that any of numerous alternative configurations may instead be employed.

Figure 3:
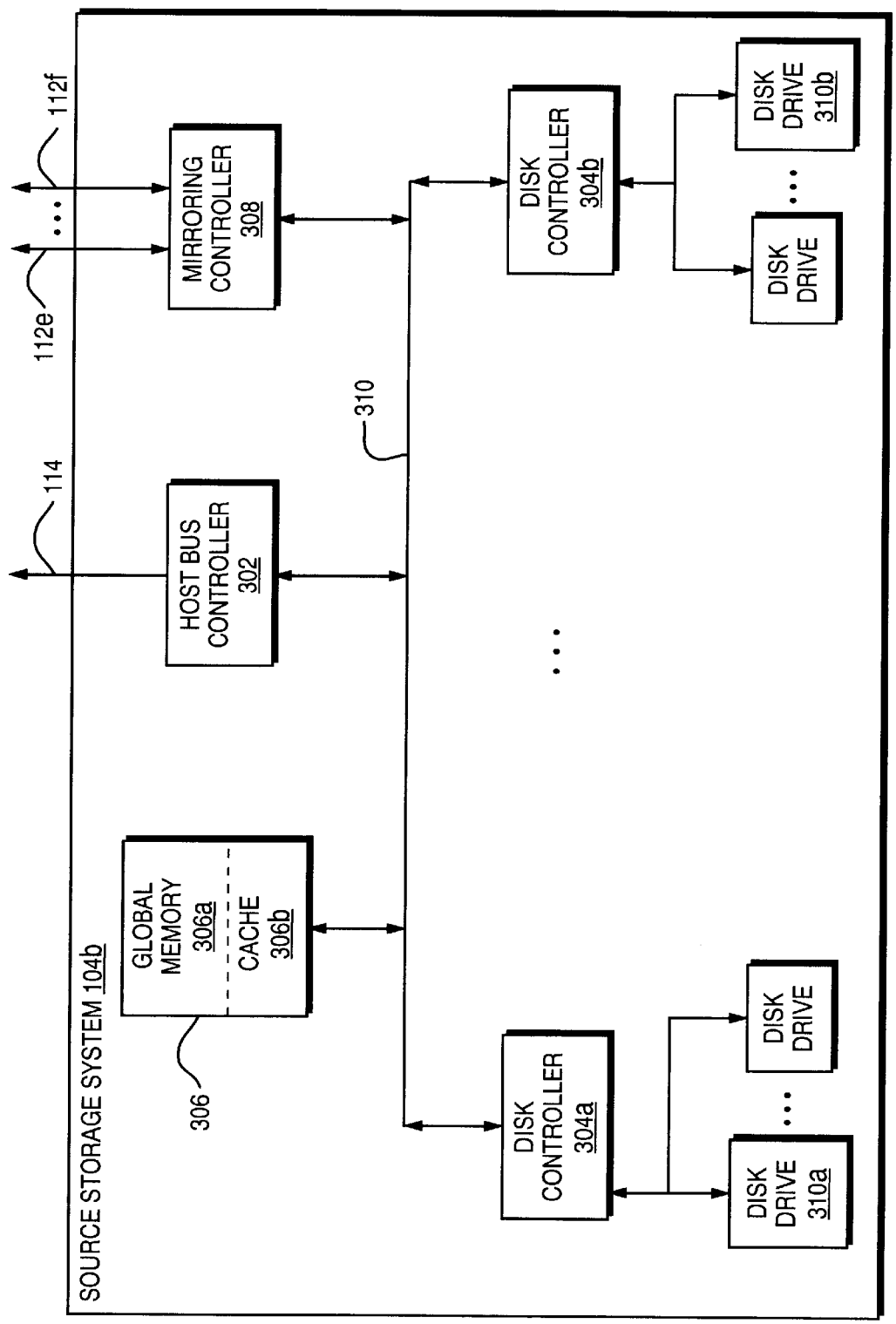
FIG. 3 is a block diagram showing one illustrative implementation of a storage system that can be used as the source and/or target storage systems of FIGS. 1 and 2.

FIG. 3 shows an illustrative example of a disc drive storage system that may be used in the data mirroring system 100 of FIG. 1 as the source storage system 104 and/or the target storage system 106. It should be appreciated that the source storage system 104 and/or the target storage system 106 of FIG. 1 may each employ a single storage system such as that shown in FIG. 3, or several such storage systems working in concert. It should also be appreciated that the present invention need not employ storage systems of the type shown in FIG. 3, and that any of numerous other types of storage systems (e.g., tape drive systems) can alternatively be employed.

As shown, the illustrative storage system 104b in FIG. 3 includes a host bus controller 302, a plurality of disc controllers 304a–b, and a plurality of disc drives 312a–b. In the example shown, the disc drives 312a–correspond to the source storage devices 110e–f of FIGS. 1–2. The host bus controller 302 is responsible for communicating with the host CPUs 102a–b (FIG. 2) via the communication links 114b and 114d. Each of the disc controllers 304a–b is responsible for controlling a subset of the disc drives 312a–b. In the example system of FIG. 3, a mirroring controller 308 controls mirroring communication for the disc drives 312a–b. For example, when the storage system 104a is used to implement the source storage system 104 of FIGS. 2–3, the mirroring controller 308 may control mirroring communication across the mirroring links 112e–f for the mirroring group 108c. It should be appreciated that in a computer system such as that shown in FIGS. 1–3, each of the storage systems 104 and 106 that supports more than one mirroring group 108 may, to facilitate this implementation, include a separate mirroring controller 308 for each mirroring group 108 that it supports.

In the FIG. 3 embodiment, the controllers 302, 308 and 304a–b communicate via an internal bus 310. Also connected to the bus 310 is a memory unit 306 including a global memory 306a and a cache 306b. The global memory 306a stores information that facilitates operation and control of the source storage system 104a. The cache 306b provides for improved system performance. In particular, when one of the host CPUs 102a–b (FIG. 2) executes a read of a track of information from the storage system 104b, if the track of information is already stored in the cache 306b, the source storage system 104b can service the read from the cache 306b, rather than from one of the disc drives 312a–b, and can thereby execute the read more efficiently. Similarly, when one of the CPUs 102a–b executes a write to the source storage system 104b, the host bus controller 302 typically executes the write to the cache 306b, and causes the I/O command chain requesting the write to be committed as soon as the data is stored in the cache 306b. Thereafter, the write may be destaged (in a manner transparent to the host CPUs 102a–b) to the appropriate one of the disc drives 312a–b. The cache can therefore be viewed as a temporary storage device, and each of the disc drives 310a–b can be viewed as a permanent storage device within the storage system 104b.

With regard to the embodiment of FIG. 3, it should be appreciated that fewer or additional controllers than those shown can be used to perform the functionality of the various embodiments of the invention, and that the invention is not limited to any particular type or number of controllers. In different embodiments, for example, the functionality of all of the controllers 302, 308 and 304a–b of FIG. 3 may be implemented by a single controller, or the functionality of any one of the controllers 302, 308 and 304a–b may be implemented by another one of the controllers 302, 308 and 304a–b, or by one or more additional controllers (not shown). As used herein, the term "controller" refers to any combination of hardware (e.g., one or more processors and/or dedicated circuit components), software and/or firmware that is capable of performing one or more of the control functions described herein.

Figure 4A:
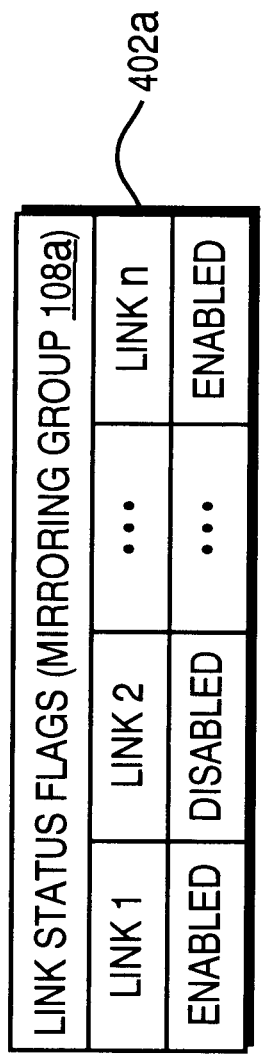
Figure 4B:
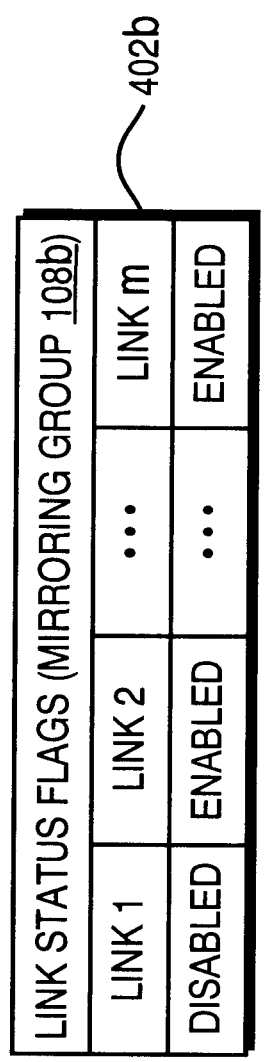

FIGS. 4A–B and 5 show examples of tables of flags 402A–B and 504 that may be stored for each source storage system 104 to permit the source storage systems 104 to ensure, in accordance with one embodiment of the present invention, that the target storage systems 106 associated therewith do not encounter data consistency errors when mirroring communication between the source and target storage systems 104 and 106 is disabled for one or more mirroring groups 108. An illustrative method by which a source storage system 104 may use the information of FIGS. 4 and 5 to achieve this result is discussed below in connection with FIG. 6.

As shown in FIGS. 4A–B, for each mirroring group 108 serviced by a source storage system 104, a respective table of flags 402 may be stored. Each table 402 reflects the current status (i.e., enabled or disabled) of each of the mirroring links 112 included in the mirroring group 108 with which it is associated. In the example of FIGS. 4A–B, the tables 402 for two mirroring groups (i.e., mirroring groups 108a and 108b) are shown, meaning that the source storage system 104 for which the information of FIGS. 4A–B is stored services two distinct mirroring groups 108. The tables 402A–B can be stored in any of numerous locations accessible to the source storage system 104 that uses them, and the invention does not require that the tables 402A–B be stored in any particular location. In one illustrative embodiment, for example, the tables 402A–B are stored in the global memory 306a of the source storage system 104a of FIG. 2.

A mirroring link 112 is "disabled" for a given source-target storage device pair when the mirroring link 112 is unable to transfer information from the source storage device 110 to the target storage device 116. In the illustrative embodiment of the invention that employs the tables 402A–B, the "enabled" and "disabled" entries in the tables 402A–B indicate the physical status of the mirroring links 112, i.e., whether the links 112 are operational or physically broken. Thus, a "disabled" entry in one of the tables 402A–B indicates that the corresponding mirroring link is physically broken so that no data can be transferred over the corresponding mirroring link 112 between any two storage devices 110, 116, whereas an "enabled" entry indicates that the corresponding mirroring link 112 is operational so that data can be transferred over the mirroring link 112 between any source-target storage device pair associated therewith.

As mentioned above, each mirroring group 108 may have a separate mirroring controller 308 associated with it. Because each mirroring controller 308 is in direct communication with the mirroring links 112 in its associated mirroring group 108, the entries in the tables 402A–B in the illustrative embodiment shown may be updated only by the mirroring controllers 308 associated with the mirroring links 112 for the respective mirroring groups 108. However, the present invention is not limited in this respect, as any device having knowledge about the status of the mirroring links 112 and access to the memory in which the tables 402A–B are stored can update the tables 402 as discussed below. In addition to the mirroring controller 308, other devices having access to the global memory 306a (e.g., the host bus controller 302 (FIG. 3) of the source storage system 104) may also utilize the information stored in the tables 402A–B in accordance with one embodiment of the invention discussed below.

FIG. 5 illustrates another table of flags 504 which may be stored for each source storage system 104. The flags 504 reflect, for each storage device 110 in the source storage system 104, (a) whether the storage device is included in a consistency group, and (b) the current "state" of the storage device. The table 504 may, for example, be stored in the global memory 306a of the source storage system 104a of FIG. 2. It should be appreciated, however, that the invention is not limited in this respect, and that the table 504 may alternatively be stored in any other location accessible to the source storage system 104. According to the illustrative embodiment shown, the flags in the table 504 identify each storage device 110 as being in one of three states: (1) "ON-LINE," (2) "OFF-LINE," or (3) "PENDING OFF-LINE." The meaning and significance of each of these states is described below in connection with the illustrative software routines of FIGS. 6 and 7.

Figure 6A:
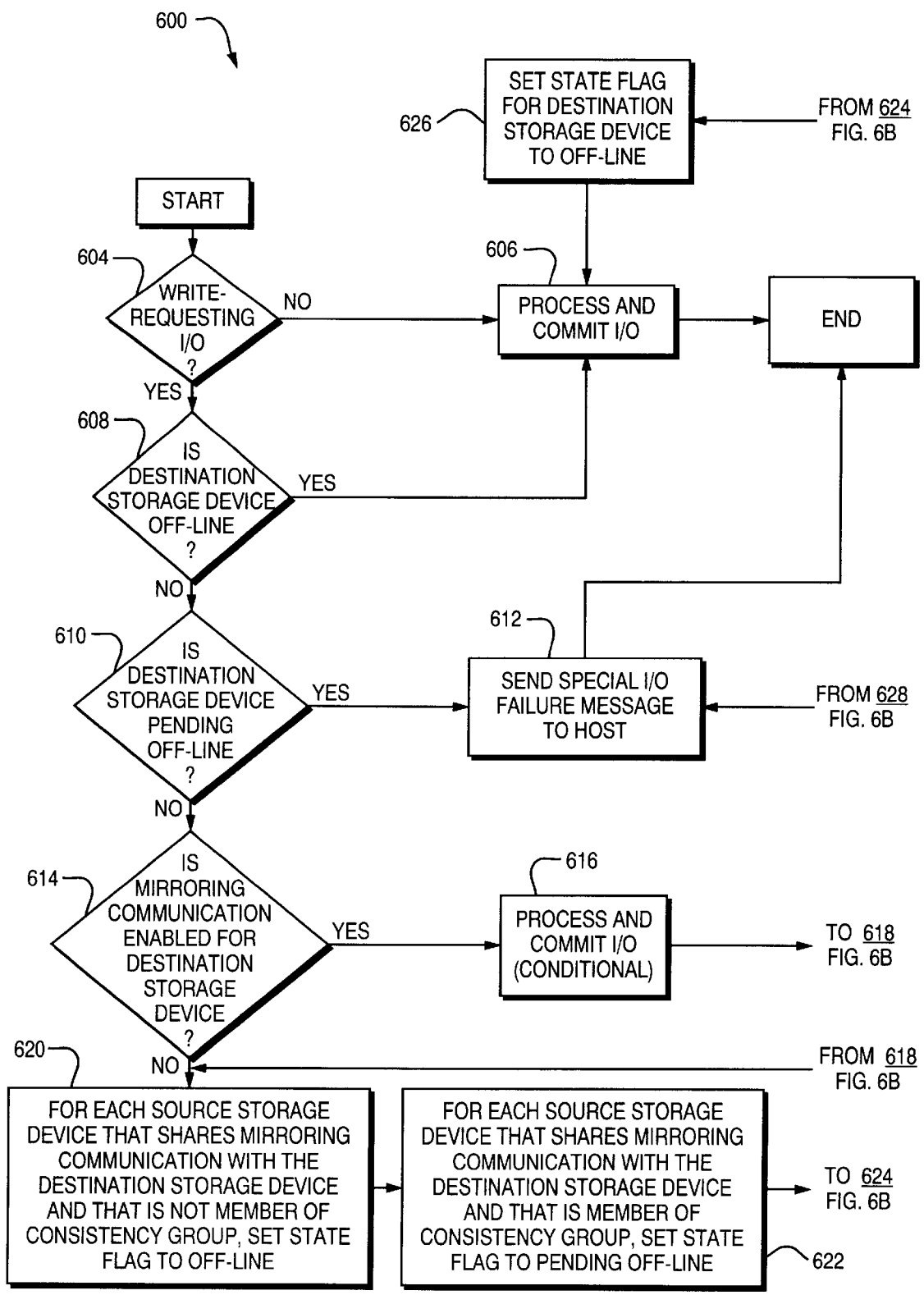
FIG. 6 is a flow chart showing an illustrative example of a process that may performed by one or more controllers of each of the source storage systems of FIGS. 1 and 2 to implement various aspects of the present invention relating to maintaining the consistency of data stored on a plurality of target storage devices.
Figure 6B:
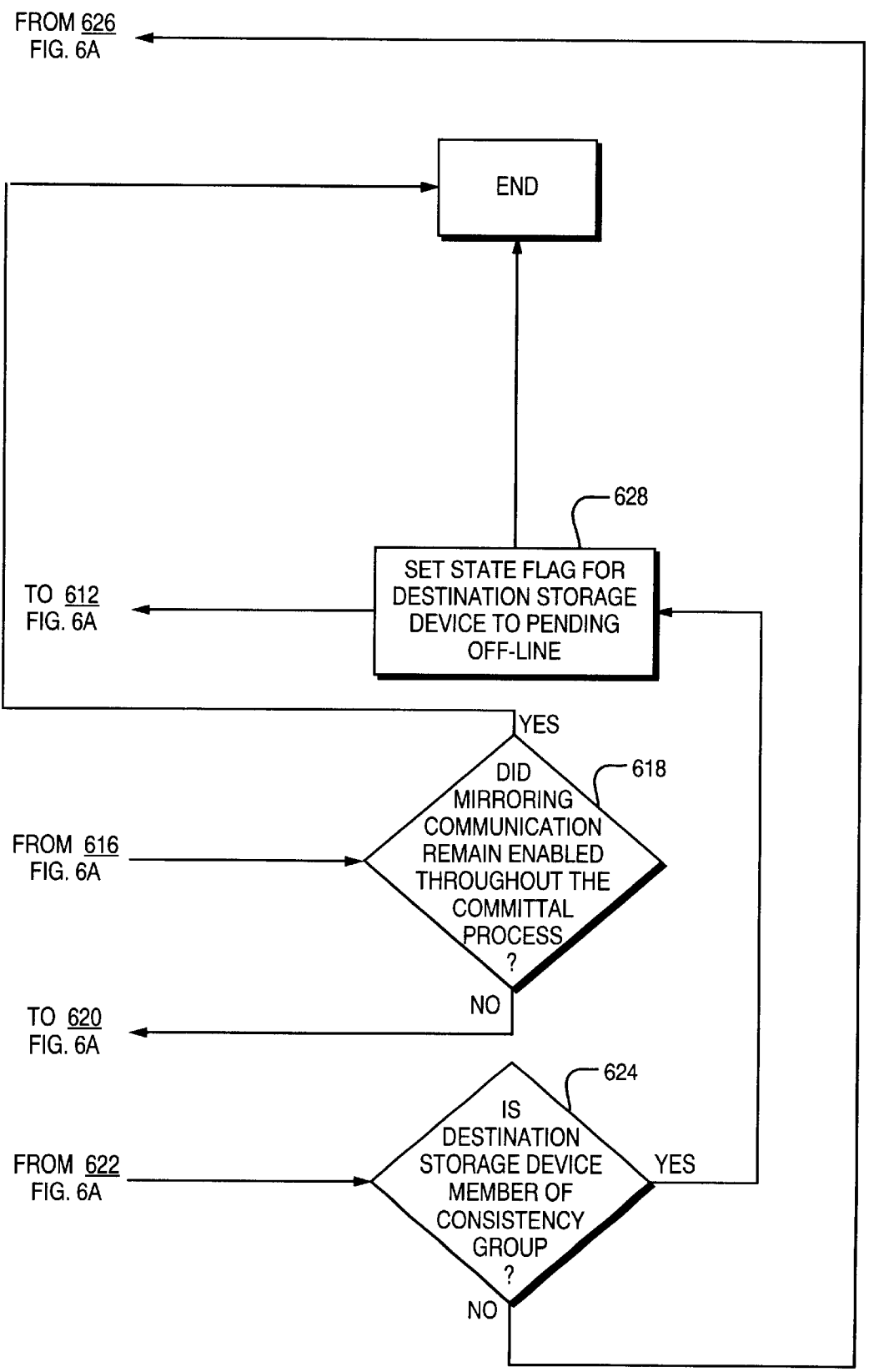

FIG. 6 shows an example of a software routine 600 that can be performed by one or more controllers (e.g., the host bus controller 302 of FIG. 3) in each of the source storage systems 104 to implement an embodiment of the invention that uses the table entries of FIGS. 4 and 5 to maintain the consistency of the data stored on the target storage system(s) 106. The software routine 600 may include a plurality of instructions stored in a computer readable medium, and the controller(s) implementing the routine 600 may, for example, execute the instructions stored on the computer-readable medium to perform the various method steps shown. Each of the controllers (e.g., 302 and 304 in FIG. 3) in the source storage system 104 may include a processor having a local memory in which microcode instructions to implement the routine 600 can be stored, or the routine 600 can be provided in another memory (e.g., global memory 306) accessible to the controller(s). Alternatively, of course, the routine 600 can be implemented using dedicated hardware, or any combination of hardware and software capable of achieving a similar result. With regard to the illustrative routine 600 of FIG. 6, it should be appreciated that the precise order of the method steps is not critical, and that the invention is not limited to embodiments that perform method steps precisely in the order shown. Additionally, it should be appreciated that the method steps shown in FIG. 6 represent only one of numerous possible routines that can achieve the desired result, and the invention is not limited to the particular routine shown. Further, it should be understood that some embodiments of the invention can perform fewer than all of the functions performed by the method steps illustrated in FIG. 6, and the invention is not limited to embodiments that employ all of the functions performed by the illustrated routine.

The routine 600 begins when the source storage system 104 (e.g., the source storage system 104b of FIG. 3) has received an I/O command chain from a host CPU 102 via a communication link 114. When an I/O command chain is received, it is determined (at step 604) whether the I/O command chain is requesting that a write be performed to one of the source storage system's storage devices 110 (e.g., one of the disc drives 312a–b of FIG. 3).

If the I/O command chain is not requesting that a write be performed (e.g., if it is requesting that a read be performed), then the routine 600 proceeds to step 606, wherein the I/O command chain is permitted to be processed and committed by the source storage system 104 in the normal manner, and the routine 600 terminates. Because I/O command chains that do not perform writes do not require the transmission of newly written data to a target storage system 106 over mirroring links 112, the status of the mirroring links 112 is not relevant to these operations, and such I/O command chains are processed and committed regardless of the status of the mirroring links 112.

If it is determined (at the step 604) that the I/O command chain is requesting that a write be performed, then the routine 600 proceeds to steps 608–610, wherein the state flag (see FIG. 5) for the destination storage device 110 (i.e., the source storage device 110 to which the write-requesting command chain is directed) is checked to determine whether the destination storage device 110 is OFF-LINE (step 608), PENDING OFF-LINE (step 610), or ON-LINE (which is assumed if the step 610 determines that the destination storage device is not PENDING OFF-LINE).

If (at the step 608) it is determined that the destination storage device 110 is OFF-LINE, then the routine 600 proceeds to the step 606, wherein the write-requesting command chain is permitted to be processed and committed by the source storage system 104. Because the destination storage device 110 is already in the OFF-LINE state, the routine 600 recognizes that the destination storage device 110 either (1) does not have a corresponding target storage device 116 associated with it, (2) was turned OFF-LINE in response to a previous iteration of the routine 600 (e.g., in step 620 or step 626), or (3) was turned OFF-LINE by an iteration of a routine 700 (FIG. 7) by a host CPU 102 (e.g., in step 712 of the routine 700) as discussed below. In the latter two cases, the previous iteration of the routine 600 or 700 will have performed steps (discussed below) to ensure that committing the write-requesting command chain at the present time, without also transferring the written data to the target storage system 106, will not result in a data consistency problem in the target storage system 106.

If (at the step 610) it is determined that the destination storage device 110 is PENDING OFF-LINE, the routine 600 proceeds to the step 612, wherein the source storage system 104 does not permit the write-requesting command chain to commit, and transmits a "special" I/O failure message back to the host CPU 102 that issued the I/O command chain. The routine 600 then terminates. The special I/O failure message indicates that the destination storage device 110 is in the PENDING OFF-LINE state. The destination storage device 110 may, for example, have been placed in the PENDING OFF-LINE state during a previous iteration of the routine 600 (e.g., in step 622 or step 628), or during an iteration of the routine 700 (FIG. 7) by a host CPU 102 (e.g., in step 708 of the routine 700) discussed below. In one illustrative embodiment, the special I/O failure message is selected so that it does not correspond to any other I/O failure message generated by source storage system 104. Therefore, the host CPU(s) 102 will always recognize the special I/O failure message as being uniquely indicative of an I/O failure resulting from a write-requesting command chain being directed to a source storage device 110 in the PENDING OFF-LINE state.

Figure 7:
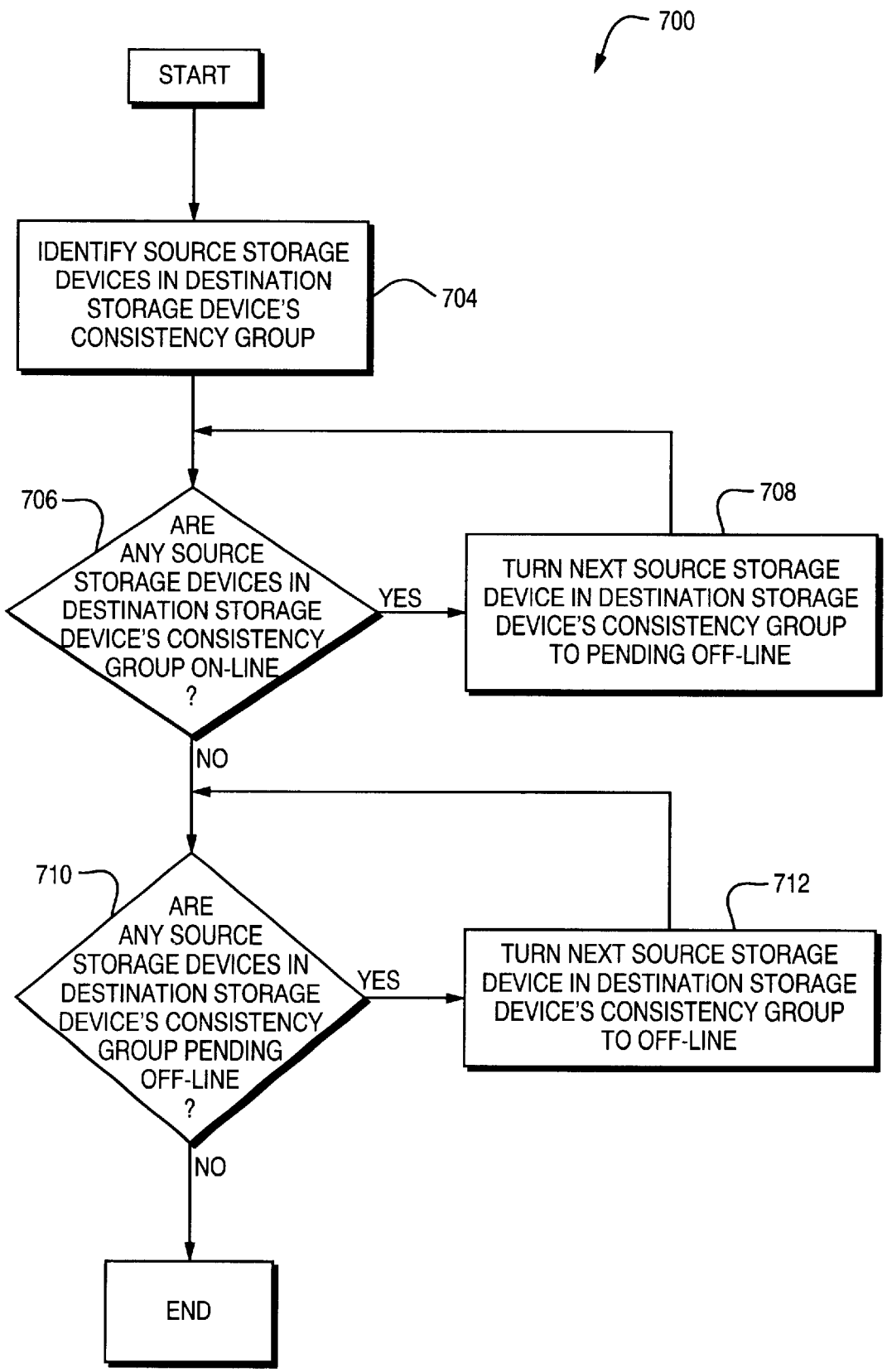
FIG. 7 is a flow chart showing an illustrative example of a software routine that may be performed by the host CPUs of FIGS. 1 and 2 to implement additional aspects of the present invention relating to maintaining the consistency of data stored on a plurality of target storage devices.

When a host CPU 102 receives the special I/O failure message, it responds by taking steps to place all of the source storage devices 110a–f that are included in the destination storage device's consistency group in the PENDING OFF-LINE state (see steps 706 and 708 in the illustrative routine 700 of FIG. 7). After all source storage devices 110a–f in the relevant consistency group have been placed in the PENDING OFF-LINE state, any host CPUs 102 that received the special I/O failure message will then take steps (e.g., according to the routine 700 described below in connection with FIG. 7) to place all of the source storage devices 110a–f included in the relevant consistency group in the OFF-LINE state (see steps 710 and 712 of the illustrative routine 700 of FIG. 7). In this regard, it should be appreciated that several different host CPUs 102 may attempt to write to source storage devices 110 that are in the PENDING OFF-LINE state before these device are subsequently turned to the OFF-LINE state. In such a situation, each host CPU 102 that attempted to write to a source storage device 110 in the PENDING OFF-LINE state will perform the routine 700 discussed below. Therefore, multiple host CPUs 102 may each independently be performing the routine 700 at the same time. After each of the storage devices 104 has been placed in the OFF-LINE state, the source storage system 104 is again permitted to commit write-requesting command chains directed to that storage device 110 (see step 608 of routine 600).

Thus, the PENDING OFF-LINE state of a destination storage device 110 corresponds to the situation described above wherein a source storage system 104 temporarily does not permit write-requesting command chains directed to the destination storage device 110 to commit during the time period that mirroring communication is being disabled for all other source storage devices 110 in the destination storage device's consistency group. The OFF-LINE state of a destination storage device 110, on the other hand, corresponds to the situation described above wherein a source storage system 104 permits write-requesting command chains to commit to a destination storage device 110 without first requiring the written data to be transferred to the target storage system 106.

It should be appreciated that any host CPU 102 that receives the special error message in response to an attempted write to a destination storage device 110 will not immediately repeat attempts to perform the write and resultingly cause the application programs running on the host CPU 102 to crash. Rather, each such host CPU 102 will instead perform the routine 700 (FIG. 7) to first place all source storage devices 110 in the relevant consistency group in the PENDING OFF-LINE state, and then place all such source storage devices 110 in the OFF-LINE state. After each host CPU 102 that receives the special error message has completed the routine 700, it will then repeat its attempt to perform the write operation. After the routine 700 has completed, all source storage devices 110 in the destination storage device's consistency group will be OFF-LINE. Thus, a subsequent attempt by any host CPU to write to the destination storage device 110 will be committed (per the step 608 of the routine 600). Therefore, the above-described situation wherein application programs on the host CPU(s) 102 were caused to crash when a source storage system 104 that lost mirroring communication for a destination storage device 110 simply prevented write-requesting command chains from committing is avoided.

If (at the step 610) it is determined that the destination storage device 110 is not PENDING OFF-LINE, then the routine 600 recognizes that the destination storage device 110 is currently ON-LINE. In the example shown, when (at the step 610) it is determined that the destination storage device 110 is ON-LINE, the routine 600 proceeds to step 614, wherein it is determined whether mirroring communication is currently enabled for the destination storage device 110. The determination in the step 614 may be made, for example, by checking the mirroring link status flags in the table 402 associated with the mirroring group 108 in which the destination storage device 110 is included to determine whether at least one mirroring link 112 is operational for the mirroring group 108. If one or more of the mirroring links 112 for the mirroring group 108 are enabled, then it is determined that mirroring communication for the destination storage device 110 is enabled. Otherwise, it is determined that mirroring communication for the destination storage device 110 is disabled.

If it is determined (at the step 614) that mirroring communication is disabled for the destination storage device 110, the routine 600 proceeds to steps 620–628, wherein actions (discussed below) are taken to maintain the consistency of the data set stored by the target storage system 106.

If it is determined (at the step 614) that mirroring communication for the destination storage device 110 is enabled, then the routine 600 proceeds to the step 616, wherein the write-requesting command chain is (conditionally) processed and committed by the target storage system 106. The routine 600 then proceeds to step 618, wherein a determination is made as to whether mirroring communication remained enabled throughout the processing and committal of the write-requesting command chain (i.e., until after the data has been transferred successfully to both the source and target storage systems 104 and 106). When it is determined that mirroring communication did remain enabled so that the write-requesting command chain was permitted to successfully commit, the routine 600 terminates. If, however, it is determined (at the step 618) that mirroring communication for the destination storage device 110 became disabled before the write-requesting command chain was committed in step 616 (e.g., during the transfer of data across the mirroring links 112), then the routine 600 proceeds to the step 620, as if the initial check of the table 402 had indicated that mirroring communication was disabled for the destination storage device 110. The determination in step 618 may be made, for example, by monitoring status of the links directly, i.e., without reference to the tables 402 (FIG. 4). Therefore, in this embodiment, the enablement of mirroring communication for the source storage devices 110 is not determined solely by reference to the tables 402. Instead, the devices responsible for the mirroring communication (e.g., the mirroring controller 308 of FIG. 3), or some other device, can also make a determination that mirroring communication for a source storage device 110 has become disabled.

When the routine 600 reaches the steps 620–622, it has determined that the source storage device 110 to which the write-requesting command chain (that resulted in the routine 600 being called) was directed is ON-LINE and cannot engage in mirroring communication with the target storage system 106. Because the destination storage device 110 is still ON-LINE, the routine 600 recognizes that the write-requesting command chain being processed is the first write-requesting command chain directed to a source storage device 110 in the destination storage device's mirroring group 108 since mirroring communication for the mirroring group 108 became disabled. Therefore, in the illustrative embodiment shown, the routine 600 takes steps to alter the states of all of the other source storage devices 110 in the destination storage device's mirroring group 108 to either OFF-LINE (step 620) or PENDING OFF-LINE (step 622) to account for the loss of mirroring communication for the mirroring group 108.

More specifically, at the step 620, for each of the source storage devices 110 that shares mirroring communication with the destination storage device 110 (i.e., that is in the destination storage device's mirroring group 108), and that is not a member of a consistency group which may be determined, for example, by checking the consistency group flag in table 504 of FIG. 5 for the destination storage device 110, the routine 600 sets the state flag for that source storage device 110 to OFF-LINE. Thus, upon subsequent iterations of the routine 600 involving write-requesting command chains directed to these source storage devices 110 that have been turned OFF-LINE, the write-requesting command chains will be permitted to process and commit per steps 608 and 606 of the routine 600, despite the fact that mirroring communication has been disabled for those source storage devices 110.

Similarly, at the step 622, for each of the source storage devices 110 that shares mirroring communication with the destination storage device 110, and that is a member of a consistency group, the routine 600 sets the state flag for that source storage device 110 to PENDING OFF-LINE. Thus, upon subsequent iterations of the routine 600 involving write-requesting command chains directed to these source storage devices 110 that have been turned to the PENDING OFF-LINE state, the routine 600 will proceed to the step 612, wherein the special I/O failure message (discussed above) will be sent to the host CPU 102 that issued the I/O command chain.

After completing the step 622 of the routine 600, it is determined at step 624 (e.g., by checking the consistency group flag in table 504 of FIG. 5) whether the destination storage device 110 is a member of a consistency group. If (at the step 624) it is determined that the destination storage device 110 is not a member of a consistency group, then the routine 600 proceeds to the step 626, wherein the state flag for the destination storage device 110 is set to OFF-LINE. It is safe to change the state flag for the destination storage device 110 immediately to the OFF-LINE state in this situation because the destination storage device 110 is not a member of a consistency group, and the data mirrored by the target storage system 106 for this source storage device 110 need not be kept consistent with the data mirrored by the target storage system 106 for any other source storage devices 110. The routine 600 then proceeds to the step 606, wherein the write-requesting command chain directed to the destination storage device 110 is processed and committed, and the routine 600 terminates. As mentioned above, when the state flag for a source storage device 110 is in the OFF-LINE state, the source storage system 104 including that storage device 110 is permitted to commit write-requesting command chains directed thereto, without requiring that the data be transferred to the target storage system 106.

If it is determined (at the step 624) that the destination storage device 110 is a member of a consistency group, then the routine 600 proceeds to the step 628, wherein the state flag for the destination storage device 110 is set to PENDING OFF-LINE. As discussed above, when a destination storage device 110 is in the PENDING OFF-LINE state, the source storage system 104 including the destination storage device 110 is temporarily prevented from committing write-requesting command chains directed to the destination storage device 110. As is also discussed above, according to one aspect of the invention, this preventing of the source storage system 104 from committing such write-requesting command chains is performed only until mirroring communication for all of the other source storage devices 110 included in the same consistency group as the destination storage device 110 has been disabled.

In the embodiment of FIG. 6, responsibility for disabling mirroring communication for the source storage devices 110 that are included in mirroring groups 108 other than the disabled mirroring group 108 that includes the destination storage device 110 is delegated to the host CPU(s) 102. In the illustrative method of FIG. 6, this goal is achieved at the step 612, wherein a special I/O failure message is transmitted to the host CPU 102 that issued the write-requesting command chain directed to the destination storage device 110.

As is explained in more detail below, in the illustrative embodiment of FIG. 7, in response to receiving this special I/O failure message, the host CPU 102 sends commands to each of the source storage systems 104 including source storage devices 110 included in the same consistency group as the destination storage device 110. These commands instruct the source storage systems 104 to set the state flags for the source storage devices 110 included in the relevant consistency group to the PENDING OFF-LINE state. After all such source storage devices 110 have been placed in the PENDING OFF-LINE state, the host CPU 102 that received the special I/O failure message then sends commands to the relevant source storage systems 104 instructing them to set the state flags for the source storage devices 110 in the relevant consistency group to the OFF-LINE state. Finally, after all source storage devices 110 in the relevant consistency group have been placed in the OFF-LINE state, the source storage systems 104 including these source storage devices 110 are again permitted to commit write-requesting command chains directed thereto. Thus, using this technique, the software running on the host CPU(s) 102 that invokes the write-request command chain will not crash because of repeated failures to write to source storage devices 110 included in a disabled mirroring group 108. Rather, whenever a host CPU 102 attempts to write to a destination storage device 110 in a disabled mirroring group 108, the source storage system 104 including the destination storage device 110 will return the special I/O failure message to the host CPU 102, thereby instructing the host CPU 102 to take the above-discussed actions to disable mirroring communication for the source storage devices 110 in the destination storage device's consistency group. After taking such actions, the host CPU 102 will then be permitted to write successfully to the destination storage device 110, even though mirroring communication for the destination storage device 110 has become disabled.

With regard to the above-described steps 620–622, wherein the states of all source storage devices 110 in the disabled mirroring group 108 are altered, it should be understood that the states of these source storage devices 110 could alternatively be altered in other ways, and need not be altered by the source storage system 104 during the iteration of the routine 600 of FIG. 6 in which the loss of mirroring communication was discovered. For example, their states could be altered by the source storage system 104 during subsequent iterations of the routine 600, or could be altered by one of the host CPU(s) 102 during execution of the routine 700 of FIG. 7 (discussed below).

In this respect, it should be appreciated that, in the illustrative embodiment of FIG. 6, the states of all of the storage source devices 110 in the destination storage devices's mirroring group 108 are altered in the steps 620–622 only as a matter of convenience. That is, for those source storage devices 110 in the disabled mirroring group 108 that are in the same consistency group as the destination storage device 110, altering the states of such source storage devices 110 to the PENDING OFF-LINE state during the first iteration of the routine 600 in which the loss of communication is discovered reduces the total number of state flags that the host CPU(s) 102 will have to alter to the PENDING OFF-LINE state when responding to the above-discussed special I/O failure message issued by the source storage system 104 in the step 612 after the state flag for the destination storage device is set to the PENDING OFF-LINE state in the step 628. In addition, for the source storage devices 110 in the disabled mirroring group 108 that are included in consistency groups other than that of the destination storage device 100, or that are not included in any consistency group, altering the states of these source storage devices 110 to the PENDING OFF-LINE state or the OFF-LINE state, respectively, prevents later iterations of the routine 600 from having to perform the steps 614–628 when a host CPU 102 attempts to write to one of these source storage devices 110 for which mirroring communication has already been determined to be disabled. In this respect, after the states of all of the source storage devices 100 for which mirroring communication has already been determined to be disabled. In this respect, after the states of all of the source storage devices 110 in the disabled mirroring group 108 have been altered, when a write is attempted to one of these source storage devices 110, the routine 600 will never reach the step 614 because each will have been previously placed in either the OFF-LINE or the PENDING OFF-LINE state.

While, in the embodiment of FIG. 6, the routine 600 causes the states of source storage devices 110 to be altered only in response to a write-requesting command chain being directed to a destination storage device 110 included in a disabled mirroring group 108, it should be appreciated that the present invention is not so limited, and that the states of the source storage devices 110 may be alternatively be altered independent of received write-requesting command chains. For example, one or more of the controllers in the source storage system 104 (e.g., controllers 302, 304, and 308 of FIG. 3) may continuously monitor the status of the mirroring links 112a–b, either directly or by means of link status tables (e.g., tables 402A–B of FIG. 4), and these controller(s) may alter the state of each of the source storage devices 110 in a mirroring group 108 whenever it is determined that mirroring communication has been lost for that mirroring group 108.

FIG. 7 shows an example of a routine 700 that may be performed by a host CPU 102 whenever the host CPU 102 receives the special I/O failure message from a source storage system 104 as discussed above. The routine 700 can be implemented on the host CPU 102 in any of numerous ways so that it is responsive to the special I/O failure message, and the invention is not limited to any particular implementation technique. For example, when the host CPU(s) 102 are implemented using mainframe computers, the routine 700 may, for example, be embedded in the code for the device drivers responsible for issuing write-requesting command chains to the source storage systems 104. In such an embodiment, the special error message returned to the host CPU(s) 102 will be received by the device driver, which can execute this embedded code to perform the routine 700. Alternatively, when the host CPU (s) 102 are implemented using open system computers, the routine 700 may, for example, be implemented at a higher level than the device driver, and the receipt of the special I/O failure message from a source storage system 104 may cause a processing "thread" to jump from the device driver code to separately implemented code for the routine 700, i.e., the special I/O failure message may temporarily "steal the processing kernel" from the device driver. It should be appreciated that the code for the routine 700 could also be embedded in the device driver code for an open system computer. However, it is often the case that the device driver code for open systems is proprietary, and is therefore difficult to access and modify. Numerous other suitable techniques that achieve a similar result will readily occur to those skilled in the art, and the invention is not limited to the specific examples described.

With regard to the illustrative routine 700 of FIG. 7, it should be appreciated that the precise order of the method steps is not critical, and that the invention is not limited to embodiments that perform method steps precisely in the order shown. Additionally, it should be appreciated that the method steps shown in FIG. 7 represent only one of numerous possible routines that can achieve the desired result, and the invention is not limited to the particular routine shown. Further, it should be understood that some embodiments of the invention can perform fewer than all of the functions performed by the method steps illustrated in FIG. 7, and the invention is not limited to embodiments that employ all of the functions performed by the illustrated routine.

The routine 700 is called when the special I/O failure message is received from a source storage system 104. When the special I/O failure message is received, the routine 700 proceeds to step 704, wherein the routine 700 identifies all of the source storage devices 110 that are included in the same consistency group as the destination storage device 110 to which the write-requesting command chain that prompted the special I/O failure message was directed. To identify the source storage device 110 to which the write-requesting command chain that prompted the special I/O failure message was directed, the host CPU(s) can either rely on its own memory regarding the source storage device to which it sent the write-requesting command chain, or can rely on information embedded in the special I/O failure message itself identifying the source storage device 110 to which the write-requesting command chain was directed. In the embodiment shown, the host CPU(s) 102 maintain information regarding which source storage devices are members of which consistency groups. Thus, the function of the step 704 can be performed by the host CPU(s) 102 simply by referring to this information for the source storage device 110 to which the write-requesting command chain that prompted the special I/O failure message was directed. After completing the step 704, the routine 700 proceeds to step 706.

At the step 706, the routine 700 determines whether there are any source storage devices 110 in the relevant consistency group that are in the ON-LINE state, and if so, proceeds to step 708. At the step 708, for each source storage device 110 identified in the step 706 as being in the ON-LINE state, the routine 700 causes the host CPU 102 to issue an I/O command chain instructing the source storage system 104 including that source storage device 110 to turn it to the PENDING OFF-LINE state.

The results of steps 706 and 708 may be achieved in any of a number of ways, and the invention is not limited to any particular technique for accomplishing the same. The host CPU 102 may, for example, sequentially poll each of the relevant source storage devices 110 to determine its current state, and, if any polled source storage device 110 remains to be turned to the PENDING OFF-LINE state, the host CPU 102 may issue an I/O command chain to effect a change of that device's state. To avoid polling devices that have already been turned to the PENDING OFF-LINE state, before the host CPU 102 begins performing the steps 706 and 708, it may, for example, first request an update to a status table (e.g., stored in the host CPU's memory) for the relevant source storage devices 110 in which the current state of each device is indicated. The host CPU 102 could then poll only the relevant source storage devices 110 that the table indicates have not yet been turned to the PENDING OFF-LINE state, and issue command chains to change the state of those devices that the polling indicates have not yet been changed. This technique may save time when multiple host CPUs 102 are performing the routine 700 simultaneously, as discussed above. Alternatively, each host CPU 102 performing the routine 700 may, for example, simply issue an I/O command chain for each source storage device 110 included in the destination storage device's consistency group, without updating a table or doing any polling of current device states, and let the source storage systems 104 determine whether or not to disregard I/O command chains requesting state changes that have already been effected.

If it is determined (at the step 706) that all of the source storage devices 110 in the destination storage device's consistency group have been turned to the PENDING OFF-LINE state, the routine 700 proceeds to step 710. At the step 710, the routine 700 determines whether there are any source storage devices 110 in the relevant consistency group that have not yet been turned to the OFF-LINE state, and if so, the routine 700 proceeds to the step 712.

At the step 712, for each source storage device 110 identified in the step 710 as being in the OFF-LINE state, the routine 700 causes the host CPU 102 to issue an I/O command chain instructing the source storage system 104 including that source storage device 110 to turn it to the OFF-LINE state. Techniques similar to those described above in connection with the steps 706 and 708 can be employed to achieve the results of the steps 710 and 712. When it is determined (at the step 710) that all of the source storage devices 110 in the destination storage device's consistency group have been turned to the OFF-LINE state, the routine 700 terminates.

In the embodiment shown in FIG. 7, the source storage systems 104 store information identifying only whether or not each source storage device 110 is included in a consistency group, and the host CPU(s) 102 store all information regarding which source storage devices 110 are included in which consistency groups. Thus, in the illustrative embodiment shown, one of the host CPUs 102 is the entity that sends commands requesting that the source storage devices 110 in the relevant consistency group be placed first in the PENDING OFF-LINE state, and then in the OFF-LINE state. It should be appreciated, however, that the disabling of mirroring communication for the source storage devices 110 in the relevant consistency group can be performed instead by one or more of the source storage systems 104, or any other device or devices in a computer system that is in communication with the source storage systems 104.

The embodiments of the present invention described above are directed to a data mirroring system including at least one host, at least one source storage system, and at least one target storage system, wherein the host performs write operations to the source storage system, and wherein mirroring communication is established between the source and target storage systems. In the particular embodiments described above, the host is described as a host CPU. However, it should be appreciated that the various embodiments of the present invention discussed above are not limited in this respect, and can be employed in a data mirroring system including numerous other types of host devices capable of writing data to the source storage system.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a data mirroring system comprising at least one host, at least one source storage system, and at least one target storage system, wherein the at least one source storage system includes at least first and second source storage devices, and the at least one target storage system includes at least first and second target storage devices, wherein the at least one host is coupled to the at least one source storage system to perform write operations to the first and second source storage devices, and wherein the at least one source storage system is coupled to the at least one target storage system to enable mirroring communication from the first source storage device to the first target storage device and from the second source storage device to the second target storage device, the method comprising a step of:

(A) when mirroring communication from the first source storage device to the first target storage device is disabled, disabling mirroring communication from the second source storage device to the second target storage device.

2. The method of claim 1, wherein the step (A) includes a step of:

(A1) disabling mirroring communication from the second source storage device to the second target storage device in response to a write-requesting command chain directed from the at least one host to the first source storage device.

3. The method of claim 2, wherein the step (A1) includes a step of:

(A2) in response to the write-requesting command chain directed from the at least one host to the first source storage device when mirroring communication from the first source storage device to the first target storage device is disabled, transmitting a first message from the at least one source storage system to the at least one host indicating that mirroring communication is disabled from the first source storage device to the first target storage device.

4. The method of claim 3, wherein the step (A1) further includes a step of:

(A3) in response to the at least one host receiving the first message from the at least one source storage system indicating that mirroring communication is disabled from the first source storage device to the first target storage device, transmitting a second message from the at least one host to the at least one source storage system instructing the at least one source storage system to disable mirroring communication from the second source storage device to the second target storage device.

5. The method of claim 1, wherein the at least one source storage system includes a plurality of source storage devices in addition to the at least first and second source storage devices, wherein the at least one target storage system includes a plurality of target storage devices in addition to the at least first and second target storage devices, wherein the at least one host is coupled to the at least one source storage system to perform write operations to the plurality of source storage devices, wherein the at least one source storage system is coupled to the at least one target storage system to enable mirroring communication from each of the plurality of source storage devices to a corresponding one of the plurality of target storage devices, wherein the at least first and second source storage devices are included in a first group of source storage devices that store logically related data for which a consistent representation is desired to be maintained on the at least one target storage system, and wherein the step (A) includes a step of:

(A1) when mirroring communication is disabled from the first source storage device to the first target storage device, disabling mirroring communication from each of the plurality of source storage devices that is included in the first group of source storage devices to the corresponding one of the plurality of target storage devices.

6. The method of claim 5, wherein the step (A1) includes a step of maintaining mirroring communication from each of the plurality of source storage devices that is not included in the first group of source storage devices to the corresponding one of the plurality of target storage devices.

7. The method of claim 5, further including a step of:

(B) after mirroring communication is disabled from the first source storage device to the first target storage device, preventing command chains from the at least one host directed to the first source storage device from committing until after mirroring communication has been disabled from all of the plurality of source storage devices that are included in the first group of source storage devices to the corresponding ones of the plurality of target storage devices.

8. The method of claim 5, further including a step of:

(B) when mirroring communication is disabled from any one of the plurality of source storage devices included in first group of source storage devices to the corresponding one of the plurality of target storage devices, preventing command chains from the at least one host directed to the one of the plurality of source storage devices from committing until after mirroring communication has been disabled from all of the plurality of source storage devices included in the first group of source storage devices to the corresponding ones of the plurality of target storage devices.

9. The method of claim 8, wherein the step (B) includes steps of:

(B1) for each one of the plurality of source storage devices included in the first group of source storage devices, storing information in the first source storage system indicating that, in response to a write-requesting command chain directed to the one of the plurality of source storage devices, the at least one source storage system should temporarily not commit the command chain; and (B2) after completing the step (B1), for each one of the plurality of source storage devices included in the first group of source storage devices, storing information in the first source storage system indicating that, in response to a write-requesting command chain directed to the one of the plurality of source storage devices, the at least one source storage system should commit the write-requesting command chain without transferring data written thereby to the corresponding one of the plurality of target storage devices.

10. The method of claim 9, wherein:

the step (B1) includes a step of, for each one of the plurality of source storage devices included in the first group of source storage devices, storing information in the at least one source storage system indicating that, in response to a write-requesting command chain directed to the one of the plurality of source storage devices, the at least one source storage system should transmit a first message to the at least one host indicating that mirroring communication is disabled from the one of the plurality of source storage devices to the corresponding one of the plurality of target storage devices; and the step (A1) includes a step of, in response to the at least one host receiving a first message from the at least one source storage system indicating that mirroring communication is disabled from one of the plurality of source storage devices included in the first group of source storage devices to the corresponding one of the plurality of target storage devices, transmitting at least one second message from the at least one host to the at least one source storage system instructing the at least one source storage system to perform the steps (B1) and (B2).

11. The method of claim 1, further including a step of:

(B) after mirroring communication has been disabled from the first source storage device to the first target storage device, preventing command chains from the at least one host directed to the first source storage device from committing until after mirroring communication has been disabled from the second source storage device to the second target storage device.

12. The method of claim 1, wherein the at least one source storage system is coupled to the at least one target storage system via at least one first mirroring link that enables mirroring communication from the first source storage device to the first target storage device and via at least one second mirroring link that enables mirroring communication from the second source storage device to the second target storage device, and wherein the step (A) includes a step of disabling mirroring communication over the at least one second mirroring link from the second source storage device to the second target storage device while permitting mirroring communication to continue over the at least one second mirroring link from a third source storage device to a third target storage device.

13. The method of claim 1, wherein the at least one source storage system is coupled to the at least one target storage system via at least one first mirroring link that enables mirroring communication from the first source storage system to the first target storage device but that does not enable mirroring communication from the second source storage device to the second target storage device, and via at least one second mirroring link that enables mirroring communication from the second source storage device to the second target storage device but that does not enable mirroring communication from the first source storage device to the first target storage device.

14. The method of claim 8, wherein the step (B) includes steps of:

(B1) temporarily placing each of the plurality of source storage devices included in the first group of source storage devices in a first state in which, in response to a write-requesting command chain directed to one of the plurality of source storage devices in the first state, the at least one source storage system temporarily does not commit the command chain; and (B2) after completing the step (B1), placing each of the plurality of source storage devices included in the first group of source storage devices in a second state in which, in response to a write-requesting command chain directed to one of the plurality of source storage devices in the second state, the at least one source storage system commits the write-requesting command chain without transferring data written thereby to the corresponding one of the plurality of target storage devices.

15. The method of claim 14, wherein:

the step (B1) includes a step of, when each of the plurality of source storage devices included in the first group of source storage devices is in the first state, in response to a write-requesting command chain directed to one of the plurality of source storage devices in the first state, the at least one source storage system transmits a first message to the at least one host indicating that mirroring communication is disabled from the one of the plurality of source storage devices to the corresponding one of the plurality of target storage devices; and the step (A1) includes a step of, in response to the at least one host receiving a first message from the at least one source storage system indicating that mirroring communication is disabled from one of the plurality of source storage devices included in the first group of source storage devices to the corresponding one of the plurality of target storage devices, transmitting at least one second message from the at least one host to the at least one source storage system instructing the at least one source storage system to perform the steps (B1) and (B2).

16. A source storage system for use in a data mirroring system including at least one host and at least one target storage system including at least first and second target storage devices of the source storage system, comprising:

at least first and second source storage devices to be coupled to the at least one host to enable the at least one host to perform write operations to the first and second source storage devices, and further to be coupled to the at least first and second target storage devices, respectively, to enable mirroring communication from the at least first and second source storage devices to the at least first and second target storage devices; and at least one controller to, responsive to mirroring communication from the first source storage device to the first target storage device becoming disabled, disable mirroring communication from the second source storage device to the second target storage device.

17. The source storage system of claim 16, wherein the at least one controller is configured to disable mirroring communication from the second source storage device to the second target storage device in response to a write-requesting command chain directed from the at least one host to the first source storage device.

18. The source storage system of claim 16, wherein the at least one target storage system includes a plurality of target storage devices in addition to the at least first and second target storage devices, and wherein:

the source storage system includes a plurality of source storage devices in addition to the at least first and second source storage devices to be coupled to the at least one host to enable the at least one host to perform write operations to the plurality of source storage devices, and further to be coupled to the plurality of target storage devices to enable mirroring communication from each of the plurality of source storage devices to a corresponding one of the plurality of target storage devices, and the at least first and second source storage devices are included in a first group of source storage devices that store logically related data for which a consistent representation is desired to be maintained on the at least one target storage system; and the at least one controller is configured to, when mirroring communication is disabled from the first source storage device to the first target storage device, disable mirroring communication from each of the plurality of source storage devices that is included in the first group of source storage devices to the corresponding one of the plurality of target storage devices.

19. The source storage system of claim 18, wherein the at least one controller is configured to disable mirroring communication from each of the plurality of source storage devices that is included in the first group of source storage devices to the corresponding one of the plurality of target storage devices when mirroring communication is disabled from the first source storage device to the first target storage device while maintaining mirroring communication from each of the plurality of source storage devices that is not included in the first group of source storage devices to the corresponding one of the plurality of target storage devices.

20. The source storage system of claim 18, wherein the at least one controller is configured to, after mirroring communication is disabled from the first source storage device to the first target storage device, prevent command chains from the at least one host directed to the first source storage device from committing until after mirroring communication has been disabled from all of the plurality of source storage devices that are included in the first group of source storage devices to the corresponding ones of the plurality of target storage devices.

21. The source storage system of claim 18, wherein the at least one controller is configured to, when mirroring communication is disabled from any one of the plurality of source storage devices included in first group of source storage devices to the corresponding one of the plurality of target storage devices, prevent command chains from the at least one host directed to the one of the plurality of source storage devices from committing until after mirroring communication has been disabled from all of the plurality of source storage devices included in the first group of source storage devices to the corresponding ones of the plurality of target storage devices.

22. The source storage system of claim 16, wherein the at least one controller is configured to, after mirroring communication has been disabled from the first source storage device to the first target storage device, prevent command chains from the at least one host directed to the first source storage device from committing until after mirroring communication has been disabled from the second source storage device to the second target storage device.

23. The source storage system of claim 16, wherein the at least one source storage system is to be coupled to the at least one target storage system via at least one first mirroring link that enables mirroring communication from the first source storage device to the first target storage device and via at least one second mirroring link that enables mirroring communication from the second source storage device to the second target storage device, and wherein the at least one controller is configured to disable mirroring communication over the at least one second mirroring link from the second source storage device to the second target storage device while permitting mirroring communication to continue over the at least one second mirroring link from a third source storage device to a third target storage device.

24. The source storage system of claim 16, wherein the at least one controller includes means for, when mirroring communication from the first source storage device to the first target storage device is disabled, disabling mirroring communication from the second source storage device to the second target storage device.

25. At least one computer-readable medium for use with at least one processor included in a data mirroring system comprising at least one host, at least one source storage system, and at least one target storage system, wherein the at least one source storage system includes at least first and second source storage devices, and the at least one target storage system includes at least first and second target storage devices, wherein the at least one host is coupled to the at least one source storage system to perform write operations to the first and second source storage devices, and wherein the at least one source storage system is coupled to the at least one target storage system to enable mirroring communication from the first source storage device to the first target storage device and from the second source storage device to the second target storage device, the at least one computer-readable medium having a plurality of instructions stored thereon which, when executed by the at least one processor, cause the at least one processor to perform a method including a step of:

(A) when mirroring communication from the first source storage device to the first target storage device is disabled, disabling mirroring communication from the second source storage device to the second target storage device.

26. The at least one computer-readable medium of claim 25, wherein the step (A) includes a step of:

(A1) disabling mirroring communication from the second source storage device to the second target storage device in response to a write-requesting command chain directed from the at least one host to the first source storage device.

27. The at least one computer-readable medium of claim 26, wherein the step (A1) includes a step of:

(A2) in response to the write-requesting command chain directed from the at least one host to the first source storage device when mirroring communication from the first source storage device to the first target storage device is disabled, transmitting a first message from the at least one source storage system to the at least one host indicating that mirroring communication is disabled from the first source storage device to the first target storage device.

28. The method of claim 27, wherein the step (A1) further includes a step of:

(A3) in response to the at least one host receiving the first message from the at least one source storage system indicating that mirroring communication is disabled from the first source storage device to the first target storage device, transmitting a second message from the at least one host to the at least one source storage system instructing the at least one source storage system to disable mirroring communication from the second source storage device to the second target storage device.

29. The at least one computer-readable medium of claim 25, wherein the at least one source storage system includes a plurality of source storage devices in addition to the at least first and second source storage devices, wherein the at least one target storage system includes a plurality of target storage devices in addition to the at least first and second target storage devices, wherein the at least one host is coupled to the at least one source storage system to perform write operations to the plurality of source storage devices, wherein the at least one source storage system is coupled to the at least one target storage system to enable mirroring communication from each of the plurality of source storage devices to a corresponding one of the plurality of target storage devices, wherein the at least first and second source storage devices are included in a first group of source storage devices that store logically related data for which a consistent representation is desired to be maintained on the at least one target storage system, and wherein the step (A) includes a step of:

(A1) when mirroring communication is disabled from the first source storage device to the first target storage device, disabling mirroring communication from each of the plurality of source storage devices that is included in the first group of source storage devices to the corresponding one of the plurality of target storage devices.

30. The at least one computer-readable medium of claim 29, wherein the step (A1) includes a step of maintaining mirroring communication from each of the plurality of source storage devices that is not included in the first group of source storage devices to the corresponding one of the plurality of target storage devices.

31. The at least one computer-readable medium of claim 29, wherein the method further includes a step of:

(B) after mirroring communication is disabled from the first source storage device to the first target storage device, preventing command chains from the at least one host directed to the first source storage device from committing until after mirroring communication has been disabled from all of the plurality of source storage devices that are included in the first group of source storage devices to the corresponding ones of the plurality of target storage devices.

32. The at least one computer-readable medium of claim 29, wherein the method further includes a step of:

(B) when mirroring communication is disabled from any one of the plurality of source storage devices included in first group of source storage devices to the corresponding one of the plurality of target storage devices, preventing command chains from the at least one host directed to the one of the plurality of source storage devices from committing until after mirroring communication has been disabled from all of the plurality of source storage devices included in the first group of source storage devices to the corresponding ones of the plurality of target storage devices.

33. The at least one computer-readable medium of claim 32, wherein the step (B) includes steps of:

(B1) for each one of the plurality of source storage devices included in the first group of source storage devices, storing information in the first source storage system indicating that, in response to a write-requesting command chain directed to the one of the plurality of source storage devices, the at least one source storage system should temporarily not commit the command chain; and (B2) after completing the step (B1), for each one of the plurality of source storage devices included in the first group of source storage devices, storing information in the first source storage system indicating that, in response to a write-requesting command chain directed to the one of the plurality of source storage devices, the at least one source storage system should commit the write-requesting command chain without transferring data written thereby to the corresponding one of the plurality of target storage devices.

34. The at least one computer-readable medium of claim 33, wherein:

the step (B1) includes a step of, for each one of the plurality of source storage devices included in the first group of source storage devices, storing information in the at least one source storage system indicating that, in response to a write-requesting command chain directed to the one of the plurality of source storage devices, the at least one source storage system should transmit a first message to the at least one host indicating that mirroring communication is disabled from the one of the plurality of source storage devices to the corresponding one of the plurality of target storage devices; and the step (A1) includes a step of, in response to the at least one host receiving a first message from the at least one source storage system indicating that mirroring communication is disabled from one of the plurality of source storage devices included in the first group of source storage devices to the corresponding one of the plurality of target storage devices, transmitting at least one second message from the at least one host to the at least one source storage system instructing the at least one source storage system to perform the steps (B1) and (B2).

35. The at least one computer-readable medium of claim 25, wherein the method further includes a step of:

(B) after mirroring communication has been disabled from the first source storage device to the first target storage device, preventing command chains from the at least one host directed to the first source storage device from committing until after mirroring communication has been disabled from the second source storage device to the second target storage device.

36. The at least one computer-readable medium of claim 25, wherein the at least one source storage system is coupled to the at least one target storage system via at least one first mirroring link that enables mirroring communication from the first source storage device to the first target storage device and via at least one second mirroring link that enables mirroring communication from the second source storage device to the second target storage device, and wherein the step (A) includes a step of disabling mirroring communication over the at least one second mirroring link from the second source storage device to the second target storage device while permitting mirroring communication to continue over the at least one second mirroring link from a third source storage device to a third target storage device.

37. The at least one computer-readable medium of claim 32, wherein the step (B) includes steps of:

(B1) temporarily placing each one of the plurality of source storage devices included in the first group of source storage devices in a first state in which, in response to a write-requesting command chain directed to the one of the plurality of source storage devices, the at least one source storage system temporarily does not commit the command chain; and (B2) after completing the step (B1), placing each one of the plurality of source storage devices included in the first group of source storage devices in a second state in which, in response to a write-requesting command chain directed to the one of the plurality of source storage devices, the at least one source storage system commits the write-requesting command chain without transferring data written thereby to the corresponding one of the plurality of target storage devices.

38. The at least one computer-readable medium of claim 37, wherein:
   the step (B1) includes a step of, when each one of the plurality of source storage devices included in the first group of source storage devices is in the first state, in response to a write-requesting command chain directed to the one of the plurality of source storage devices, the at least one source storage system transmits a first message to the at least one host indicating that mirroring communication is disabled from the one of the plurality of source storage devices to the corresponding one of the plurality of target storage devices; and
   the step (A1) includes a step of, in response to the at least one host receiving a first message from the at least one source storage system indicating that mirroring communication is disabled from one of the plurality of source storage devices included in the first group of source storage devices to the corresponding one of the plurality of target storage devices, transmitting at least one second message from the at least one host to the at least one source storage system instructing the at least one source storage system to perform the steps (B1) and (B2).

39. A method for use in a data mirroring system comprising at least one host, at least one source storage system, and at least one target storage system, wherein the at least one source storage system includes at least first and second source storage devices, and the at least one target storage system includes at least first and second target storage devices, wherein the at least one host is coupled to the at least one source storage system to perform write operations to the at least first and second source storage devices, and wherein the at least one source storage system is coupled to the at least one target storage system to enable mirroring communication from the first source storage device to the first target storage device and from the second source storage device to the second target storage device, the method comprising a step of:
   (A) in response to the at least one host receiving an indication that mirroring communication from the first source storage device to the first target storage device is disabled, instructing the at least one source storage system to disable mirroring communication from the second source storage device to the second target storage device.

40. The method of claim 39, wherein the at least one source storage system includes a plurality of source storage devices in addition to the at least first and second source storage devices, wherein the at least one target storage system includes a plurality of target storage devices in addition to the at least first and second target storage devices, wherein the at least one host is coupled to the at least one source storage system to perform write operations to the plurality of source storage devices, wherein the at least one source storage system is coupled to the at least one target storage system to enable mirroring communication from each of the plurality of source storage devices to a corresponding one of the plurality of target storage devices, wherein the at least first and second source storage devices are included in a first group of source storage devices that store logically related data for which a consistent representation is desired to be maintained on the at least one target storage system, and wherein the step (A) includes a step of:
   (A1) in response to the at least one host receiving the indication that mirroring communication from the first source storage device to the first target storage device is disabled, instructing the at least one source storage system to disable mirroring communication from each of the plurality of source storage devices that is included in the first group of source storage devices to the corresponding one of the plurality of target storage devices.

41. The method of claim 40, wherein the step (A1) includes steps of: (A2) instructing the at least one source storage system to temporarily not commit write-requesting command chains directed to ones of the plurality of source storage devices that are included in the first group of source storage devices; and
   (A3) after completing the step (A2), instructing the at least one source storage system to commit write-requesting command chains directed to ones of the plurality of source storage devices that are included in the first group of storage devices without transferring data written thereby to corresponding ones of the plurality of target storage devices.

42. The method of claim 40, wherein the step (A1) includes a step of maintaining mirroring communication from each of the plurality of source storage devices not included in the first group of source storage devices to the corresponding one of the plurality of target storage devices.

43. The method of claim 39, wherein the at least one source storage system is coupled to the at least one target storage system via at least one first mirroring link that enables mirroring communication from the first source storage device to the first target storage device and via at least one second mirroring link that enables mirroring communication from the second source storage device to the second target storage device, and wherein the step (A) includes a step of instructing the at least one source storage system to disable mirroring communication over the at least one second mirroring link from the second source storage device to the second target storage device while permitting mirroring communication to continue over the at least one second mirroring link from a third source storage device to a third target storage device.

44. The method of claim 39, wherein the at least one source storage system is coupled to the at least one target storage system via at least one first mirroring link that enables mirroring communication from the first source storage system to the first target storage device but that does not enable mirroring communication from the second source storage device to the second target storage device, and via at least one second mirroring link that enables mirroring communication from the second source storage device to the second target storage device but that does not enable mirroring communication from the first source storage device to the first target storage device.

45. At least one computer-readable medium for use with at least one host processor of a data mirroring system including the at least one host processor, at least one source storage system, and at least one target storage system, wherein the at least one source storage system includes at least first and second source storage devices, and the at least one target storage system includes at least first and second target storage devices, wherein the at least one host processor is coupled to the at least one source storage system to perform write operations to the at least first and second source storage devices, and wherein the at least one source storage system is coupled to the at least one target storage system to enable mirroring communication from the first source storage device to the first target storage device and from the second source storage device to the second target storage device, the at least one computer-readable medium having a plurality of instructions stored thereon which, when executed by the at least one host processor, cause the at least one processor to perform a method including a step of:

(A) in response to the at least one host processor receiving an indication that mirroring communication from the first source storage device to the first target storage device is disabled, instructing the at least one source storage system to disable mirroring communication from the second source storage device to the second target storage device.

46. The at least one computer-readable medium of claim 45, wherein the at least one source storage system includes a plurality of source storage devices in addition to the at least first and second source storage devices, wherein the at least one target storage system includes a plurality of target storage devices in addition to the at least first and second target storage devices, wherein the at least one host is coupled to the at least one source storage system to perform write operations to the plurality of source storage devices, wherein the at least one source storage system is coupled to the at least one target storage system to enable mirroring communication from each of the plurality of source storage devices to a corresponding one of the plurality of target storage devices, wherein the at least first and second source storage devices are included in a first group of source storage devices that store logically related data for which a consistent representation is desired to be maintained on the at least one target storage system, and wherein the step (A) includes a step of:

(A1) in response to the at least one host processor receiving the indication that mirroring communication from the first source storage device to the first target storage device is disabled, instructing the at least one source storage system to disable mirroring communication from each of the plurality of source storage devices that is included in the first group of source storage devices to the corresponding one of the plurality of target storage devices.

47. The at least one computer-readable medium of claim 46, wherein the step (A1) includes steps of:

(A2) instructing the at least one source storage system to temporarily not commit write-requesting command chains directed to ones of the plurality of source storage devices that are included in the first group of source storage devices; and (A3) after completing the step (A2), instructing the at least one source storage system to commit write-requesting command chains directed to ones of the plurality of source storage devices that are included in the first group of storage devices without transferring data written thereby to corresponding ones of the plurality of target storage devices.

48. The method of claim 46, wherein the step (A1) includes a step of maintaining mirroring communication from each of the plurality of source storage devices that is not included in the first group of source storage devices to the corresponding one of the plurality of target storage devices.

49. The method of claim 45, wherein the at least one source storage system is coupled to the at least one target storage system via at least one first mirroring link that enables mirroring communication from the first source storage device to the first target storage device and via at least one second mirroring link that enables mirroring communication from the second source storage device to the second target storage device, and wherein the step (A) includes a step of instructing the at least one source storage system to disable mirroring communication over the at least one second mirroring link from the second source storage device to the second target storage device while permitting mirroring communication to continue over the at least one second mirroring link from a third source storage device to a third target storage device.

50. A host for use in a data mirroring system including at least one source storage system, and at least one target storage system, wherein the at least one source storage system includes at least first and second source storage devices to store date written by the host, and the at least one target storage system includes at least first and second target storage devices, and wherein the at least one source storage system is coupled to the at least one target storage system to enable mirroring communication from the first source storage device to the first target storage device and from the second source storage device to the second target storage device, the host comprising:

at least one controller to, responsive to receiving an indication that mirroring communication from the first source storage device to the first target storage device is disabled, instruct the at least one source storage system to disable mirroring communication from the second source storage device to the second target storage device.

51. The host of claim 50, wherein the at least one source storage system includes a plurality of source storage devices in addition to the at least first and second source storage devices, wherein the at least one target storage system includes a plurality of target storage devices in addition to the at least first and second target storage devices, wherein the at least one source storage system is coupled to the at least one target storage system to enable mirroring communication from each of the plurality of source storage devices to a corresponding one of the plurality of target storage devices, wherein the at least first and second source storage devices are included in a first group of source storage devices that store logically related data for which a consistent representation is desired to be maintained on the at least one target storage system, and wherein:

the at least one controller is configured to, responsive to receiving the indication that mirroring communication from the first source storage device to the first target storage device is disabled, instruct the at least one source storage system to disable mirroring communication from each of the plurality of source storage devices that is included in the first group of source storage devices to the corresponding one of the plurality of target storage devices.

52. The host of claim 51, wherein the at least one controller is configured to, responsive to receiving the indication that mirroring communication from the first source storage device to the first target storage device is disabled, instruct the at least one source storage system to temporarily not commit write-requesting command chains directed to ones of the plurality of source storage devices that are included in the first group of source storage devices, and is further configured to, after instructing the at least one source storage system to temporarily not commit write-requesting command chains directed to ones of the plurality of source storage devices that are included in the first group of source storage devices, instruct the at least one source storage system to commit write-requesting command chains directed to ones of the plurality of source storage devices that are included in the first group of storage devices without transferring data written thereby to corresponding ones of the plurality of target storage devices.

53. The host of claim 50, wherein the at least one source storage system is coupled to the at least one target storage system via at least one first mirroring link that enables mirroring communication from the first source storage device to the first target storage device and via at least one second mirroring link that enables mirroring communication from the second source storage device to the second target storage device, and wherein the at least one controller is configured to, responsive to receiving the indication that mirroring communication from the first source storage device to the first target storage device is disabled, instruct the at least one source storage system to disable mirroring communication over the at least one second mirroring link from the second source storage device to the second target storage device while permitting mirroring communication to continue over the at least one second mirroring link from a third source storage device to a third target storage device.

54. A method for use in a data mirroring system comprising at least one host, at least one source storage system, and at least one target storage system, wherein the at least one source storage system includes a plurality of mirrored source storage devices, and the at least one target storage system includes a plurality of target storage devices, wherein the at least one host is coupled to the at least one source storage system to perform write operations to the plurality of mirrored source storage devices, and wherein the at least one source storage system is coupled to the at least one target storage system to enable mirroring communication from each of the plurality of mirrored source storage devices to a corresponding one of the plurality of target storage devices, the method comprising steps of:
(A) storing information in the data mirroring system identifying at least one subset of the plurality of mirrored source storage devices for which a consistent representation of data is desired to be maintained on at least one corresponding subset of the plurality of target storage devices.

55. The method of claim 54, further including a step of:
(B) using the information stored in the step (A) to ensure that a consistent representation of data is maintained on the at least one corresponding subset of the plurality of target storage devices.

56. The method of claim 54, wherein the at least one subset of the plurality of mirrored source storage devices includes a plurality of subsets of the plurality of mirrored source storage devices, and wherein the step (A) includes a step of storing information in the at least one host identifying which of the plurality of mirrored source storage devices are included in which of the plurality of subsets of the plurality of mirrored source storage devices.

57. The method of claim 56, wherein the step (A) further includes a step of:
(A1) storing information in the at least one source storage system identifying whether each of the plurality of mirrored source storage devices is a member of a consistency group.

58. The method of claim 54, wherein the step (A) further includes a step of:
(A1) storing information in the at least one source storage system identifying whether each of the plurality of mirrored source storage devices is a member of a consistency group.

59. A host for use in a data mirroring system comprising at least one source storage system including a plurality of mirrored source storage devices, and at least one target storage system including a plurality of target storage devices, wherein the at least one source storage system is coupled to the at least one target storage system to enable mirroring communication from each of the plurality of mirrored source storage devices to a corresponding one of the plurality of target storage devices, the host comprising:
at least one storage element; and
at least one controller to be coupled to the at least one source storage system to perform write operations to the plurality of mirrored source storage devices, the at least one controller being configured to store information in the at least one storage element identifying at least one subset of the plurality of mirrored source storage devices for which a consistent representation of data is desired to be maintained on at least one corresponding subset of the plurality of target storage devices.

60. The host of claim 59, wherein the at least one subset of the plurality of mirrored source storage devices includes a plurality of subsets of the plurality of mirrored source storage devices, and wherein the at least one controller is configured to store information in the at least one storage element identifying which of the plurality of mirrored source storage devices are included in which of the plurality of subsets of the plurality of mirrored source storage devices.

61. A source storage system for use in a data mirroring system comprising at least one host, and at least one target storage system including a plurality of target storage devices, the source storage system comprising:
a plurality of mirrored source storage devices to be coupled to the at least one host to permit the at least one host to perform write operations to the plurality of mirrored source storage devices, and to be further coupled to the at least one target storage system to enable mirroring communication from each of the plurality of mirrored source storage devices to a corresponding one of the plurality of target storage devices;
at least one storage element; and
at least one controller to store information in the at least one storage element identifying ones of the plurality of mirrored source storage devices that each belongs to a subset of the plurality of mirrored source storage devices for which a consistent representation of data is desired to be maintained on at least one corresponding subset of the plurality of target storage devices.

62. The source storage system of claim 61, wherein the at least one controller is configured to store the information in the at least one storage element identifying whether each of the plurality of mirrored source storage devices is a member of a consistency group.

63. A method for use in a data mirroring system comprising at least one host, at least one source storage system, and at least one target storage system, wherein the at least one source storage system includes a plurality of mirrored source storage devices, and the at least one target storage system includes a plurality of target storage devices, wherein the at least one host is coupled to the at least one source storage system to perform write operations to the plurality of mirrored source storage devices, and wherein the at least one source storage system is coupled to the at least one target storage system to enable mirroring communication from each of the plurality of mirrored source storage devices to a corresponding one of the plurality of target storage devices, the method comprising steps of:

(A) placing at least one of the plurality of mirrored source storage devices in one of a first state, a second state, and a third state;

(B1) in response to the source storage system receiving a write-requesting command chain directed to the at least one of the plurality of mirrored source storage devices when the at least one of the plurality of mirrored source storage devices is in the first state, permitting the command chain to commit and transferring data written by the command chain to the corresponding one of the plurality of target storage devices;

(B2) in response to the source storage system receiving a write-requesting command chain directed to the at least one of the plurality of mirrored source storage devices when the at least one of the plurality of mirrored source storage devices is in the second state, preventing the command chain from committing; and (B3) in response to the source storage system receiving a write-requesting command chain directed to the at least one of the plurality of mirrored source storage devices when the at least one of the plurality of mirrored source storage devices is in the third state, permitting the command chain to commit without transferring data written by the command chain to the corresponding one of the plurality of target storage devices.

64. A source storage system for use in a data mirroring system including at least one host, and at least one target storage system including a plurality of target storage devices, the source storage system comprising:

a plurality of mirrored source storage devices to be coupled to the at least one host to permit the at least one host to perform write operations to the plurality of mirrored source storage devices, and to be further coupled to the plurality of target storage devices to enable mirroring communication from each of the plurality of mirrored source storage devices to a corresponding one of the plurality of target storage devices; and at least one controller to place at least one of the plurality of mirrored source storage devices in one of a first state, a second state, and a third state, wherein, in response to the source storage system receiving a write-requesting command chain directed to the at least one of the plurality of mirrored source storage devices when the at least one of the plurality of mirrored source storage devices is in the first state, the at least one controller permits the command chain to commit and transfers data written by the command chain to the corresponding one of the plurality of target storage devices, wherein, in response to the source storage system receiving a write-requesting command chain directed to the at least one of the plurality of mirrored source storage devices when the at least one of the plurality of mirrored source storage devices is in the second state, the at least one controller prevents the command chain from committing, and wherein, in response to the source storage system receiving a write-requesting command chain directed to the at least one of the plurality of mirrored source storage devices when the at least one of the plurality of mirrored source storage devices is in the third state, the at least one controller permits the command chain to commit without transferring data written by the command chain to the corresponding one of the plurality of target storage devices.

65. At least one computer-readable medium for use with at least one processor included in a data mirroring system comprising at least one host, at least one source storage system, and at least one target storage system, wherein the at least one source storage system includes a plurality of mirrored source storage devices, and the at least one target storage system includes a plurality of target storage devices, wherein the at least one host is coupled to the at least one source storage system to perform write operations to the plurality of mirrored source storage devices, and wherein the at least one source storage system is coupled to the at least one target storage system to enable mirroring communication from each of the plurality of mirrored source storage devices to a corresponding one of the plurality of target storage devices, the at least one computer-readable medium having a plurality of instructions stored thereon which, when executed by the at least one processor, cause the at least one processor to perform a method including steps of:

(A) placing at least one of the plurality of mirrored source storage devices in one of a first state, a second state, and a third state;

(B1) in response to the source storage system receiving a write-requesting command chain directed to the at least one of the plurality of mirrored source storage devices when the at least one of the plurality of mirrored source storage devices is in the first state, permitting the command chain to commit and transferring data written by the command chain to the corresponding one of the plurality of target storage devices;

(B2) in response to the source storage system receiving a write-requesting command chain directed to the at least one of the plurality of mirrored source storage devices when the at least one of the plurality of mirrored source storage devices is in the second state, preventing the command chain from committing; and (B3) in response to the source storage system receiving a write-requesting command chain directed to the at least one of the plurality of mirrored source storage devices when the at least one of the plurality of mirrored source storage devices is in the third state, permitting the command chain to commit without transferring data written by the command chain to the corresponding one of the plurality of target storage devices.

* * * * *